United States Patent
Hseih et al.

(10) Patent No.: US 9,692,997 B2
(45) Date of Patent: *Jun. 27, 2017

(54) PIXEL READOUT ARCHITECTURE FOR FULL WELL CAPACITY EXTENSION

(71) Applicant: QUALCOMM Incorporated, San Diego, CA (US)

(72) Inventors: Biay-Cheng Hseih, Irvine, CA (US); Jiafu Luo, Irvine, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,326

(22) Filed: Mar. 28, 2016

(65) Prior Publication Data

US 2016/0269661 A1    Sep. 15, 2016

Related U.S. Application Data

(63) Continuation of application No. 14/562,444, filed on Dec. 5, 2014, now Pat. No. 9,332,200.

(51) Int. Cl.
*H04N 5/363* (2011.01)
*H04N 5/378* (2011.01)
(Continued)

(52) U.S. Cl.
CPC ........... *H04N 5/363* (2013.01); *H04N 5/3559* (2013.01); *H04N 5/35572* (2013.01);
(Continued)

(58) Field of Classification Search
CPC .. H04N 5/363; H04N 5/3765; H04N 5/35581; H04N 5/374; H04N 5/35572;
(Continued)

(56) References Cited

U.S. PATENT DOCUMENTS 5,543,838 A    8/1996  Hosier et al.
7,518,759 B2   4/2009  Hosier et al.
(Continued)

OTHER PUBLICATIONS

Hondongwa D., et al., "Quanta Image Sensor (QIS): Early Research Progress," In Proc. 2013 Optical Society of America (OSA) Mtg. on Imaging Systems and Applications, Arlington, VA, Jun. 24-27, 2013, pp. 1-3.
(Continued)

*Primary Examiner* — Gevell Selby
(74) *Attorney, Agent, or Firm* — Knobbe, Martens, Olson & Bear LLP

(57) ABSTRACT

Certain aspects relate to systems and techniques for full well capacity extension. For example, a storage capacitor included in the pixel readout architecture can enable multiple charge dumps from a pixel in the analog domain, extending the full well capacity of the pixel. Further, multiple reads can be integrated in the digital domain using a memory, for example DRAM, in communication with the pixel readout architecture. This also can effectively multiply a small pixel's full well capacity. In some examples, multiple reads in the digital domain can be used to reduce, eliminate, or compensate for kTC noise in the pixel readout architecture.

20 Claims, 18 Drawing Sheets

(51) Int. Cl.
*H04N 5/374* (2011.01)
*H04N 5/355* (2011.01)
*H04N 5/376* (2011.01)
*H04N 5/3745* (2011.01)

(52) U.S. Cl.
CPC ......... *H04N 5/35581* (2013.01); *H04N 5/374* (2013.01); *H04N 5/378* (2013.01); *H04N 5/3745* (2013.01); *H04N 5/3765* (2013.01); *H04N 5/37452* (2013.01)

(58) Field of Classification Search
CPC .. H04N 5/37452; H04N 5/3559; H04N 5/378; H04N 5/3745
See application file for complete search history.

(56) References Cited

U.S. PATENT DOCUMENTS

| | | | |
|---|---|---|---|
| 7,538,307 | B1 | 5/2009 | Lauxtermann |
| 8,222,586 | B2 | 7/2012 | Lee |
| 8,547,458 | B2 | 10/2013 | Iwasawa |
| 8,638,382 | B2 | 1/2014 | Itonaga et al. |
| 9,332,200 | B1* | 5/2016 | Hseih ............ H04N 5/363 |
| 9,560,296 | B2 | 1/2017 | Hseih |
| 2003/0058356 | A1 | 3/2003 | DiCarlo et al. |
| 2005/0035381 | A1 | 2/2005 | Holm et al. |
| 2005/0046715 | A1 | 3/2005 | Lim et al. |
| 2005/0110885 | A1* | 5/2005 | Altice, Jr. ............ H04N 5/363 348/308 |
| 2005/0128327 | A1 | 6/2005 | Bencuya et al. |
| 2006/0284999 | A1 | 12/2006 | Muramatsu et al. |
| 2007/0091190 | A1 | 4/2007 | Iwabuchi et al. |
| 2008/0055441 | A1 | 3/2008 | Altice |
| 2008/0083939 | A1 | 4/2008 | Guidash |
| 2008/0170149 | A1 | 7/2008 | Iida et al. |
| 2008/0309800 | A1 | 12/2008 | Olsen et al. |
| 2009/0108176 | A1 | 4/2009 | Blanquart |
| 2009/0184349 | A1 | 7/2009 | Dungan |
| 2009/0189234 | A1 | 7/2009 | Mabuchi |
| 2009/0219421 | A1 | 9/2009 | Altice, Jr. et al. |
| 2010/0019130 | A1 | 1/2010 | Lee |
| 2010/0060764 | A1 | 3/2010 | McCarten et al. |
| 2010/0097508 | A1* | 4/2010 | Yanagita ............ H04N 5/3532 348/301 |
| 2011/0101420 | A1 | 5/2011 | Patel |
| 2011/0121162 | A1 | 5/2011 | Murata et al. |
| 2011/0163223 | A1 | 7/2011 | Guidash |
| 2011/0303827 | A1 | 12/2011 | Altice |
| 2012/0050597 | A1 | 3/2012 | Maeda et al. |
| 2013/0033631 | A1 | 2/2013 | Mabuchi |
| 2013/0135486 | A1 | 5/2013 | Wan |
| 2013/0141619 | A1 | 6/2013 | Lim et al. |
| 2013/0188079 | A1 | 7/2013 | Sakano |
| 2013/0307103 | A1 | 11/2013 | Lin et al. |
| 2013/0334403 | A1 | 12/2013 | Kozlowski |
| 2014/0008520 | A1 | 1/2014 | Raynor |
| 2014/0077057 | A1 | 3/2014 | Chao et al. |
| 2014/0084143 | A1 | 3/2014 | Sakano et al. |
| 2014/0117204 | A1 | 5/2014 | Ha |
| 2014/0226047 | A1 | 8/2014 | Lahav et al. |

OTHER PUBLICATIONS

International Search Report and Written Opinion—PCT/US2015/059554—ISA/EPO—Feb. 10, 2016.

Vogelsang T., et al., "Overcoming the Full Well Capacity Limit: High Dynamic Range Imaging Using Multi-Bit Temporal Oversampling and Conditional Reset," Rambus Inc., International Image Sensor Workshop, 2013, pp. 1-4.

International Preliminary Report on Patentability dated Mar. 8, 2017 for PCT US2015/059554, filed Nov. 6, 2015; 37 pages.

* cited by examiner

PIXEL READOUT ARCHITECTURE FOR FULL WELL CAPACITY EXTENSION

CROSS-REFERENCE TO RELATED APPLICATIONS

The present application is a continuation of U.S. patent application Ser. No. 14/562,444, filed on Dec. 5, 2014, entitled "PIXEL READOUT ARCHITECTURE FOR FULL WELL CAPACITY EXTENSION," and is related to U.S. patent application Ser. No. 14/562,380, filed on Dec. 5, 2014, entitled "PIXEL READOUT ARCHITECTURE FOR FULL WELL CAPACITY EXTENSION," the contents of each which are hereby incorporated by reference herein.

TECHNICAL FIELD

The systems and methods disclosed herein are directed to photo sensors, and, more particularly, to full well capacity extension.

BACKGROUND

Full well capacity is the largest charge a pixel can hold before saturation which results in degradation of the signal. When the charge in a pixel exceeds the saturation level, the charge starts to fill adjacent pixels, a process known as blooming. The sensor also starts to deviate from a linear response and hence compromises the quantitative performance of the camera.

The dynamic range of a camera is typically defined as the full well capacity divided by the camera noise and relates to the ability of a camera to record simultaneously very low light signals alongside bright signals. Dynamic range, the ratio between the well capacity and noise floor, is a measure of how well a sensor can measure an accurate signal at low light intensities all the way up until it reaches full well capacity. Given a similar noise floor, the dynamic range of a sensing element is proportional to its well capacity, which is typically proportional to the size of such light sensing elements. Larger pixels have greater full well capacity and accordingly higher dynamic range.

In digital imaging, the dynamic range of a complementary metal-oxide-semiconductor (CMOS) sensor may, at times, be insufficient to accurately represent outdoor scenes. This may be especially true in the more compact sensors which may be used in mobile devices, for example in the camera on a mobile telephone. For example, a typical sensor used in a mobile device camera may have a dynamic range of approximately 60-70 dB. However, a typical natural outdoor scene can easily cover a contrast range of 100 dB between light areas and shadows. Because this dynamic range is greater than the dynamic range of a typical sensor used in a mobile device, detail may be lost in images captured by mobile devices.

Further, the trend in digital cameras is toward smaller pixels to drive megapixel count upward or to enable smaller sensor areas, and smaller pixels can suffer from more limited full well capacity than larger pixels. Particularly in mobile sensors, the trend in pixel size is to shrink the pixel size and also sensor area and attempt to maintain performance through advanced processing. Reduced full well capacity, reduced quantum efficiency, and reduced photosensitivity of the sub-micron pixel detector array has greatly degraded signal-to-noise ratio (SNR) and dynamic range of the image sensor. In addition, higher cross-talk of the reduced pixel size results in image quality issues for example poor modulation transfer function (MTF) and color fidelity.

SUMMARY

The foregoing problems, among others, are addressed in some embodiments by the pixel readout architecture and techniques for full well capacity extension described herein. An additional storage capacitor included in the pixel readout architecture can enable multiple charge dumps from a pixel in the analog domain, extending the full well capacity of the pixel. Further, multiple reads can be integrated in the digital domain using a memory, for example DRAM, in communication with the pixel readout architecture. This also can effectively multiply a small pixel's full well capacity. In some embodiments, multiple reads in the digital domain can be used to reduce, eliminate, or compensate for kTC noise in the pixel readout architecture.

Accordingly, one aspect relates to an imaging system comprising an array including a plurality of photosensitive elements; a plurality of circuits for reading light integrated in photosensitive elements coupled thereto, each of the plurality of circuits comprising at least one storage capacitor in communication with at least one photosensitive element of the plurality of photosensitive elements, the storage capacitor having capacitance for storage of an accumulated charge representing a plurality of charge dumps from the at least one photosensitive element, each of the plurality of charge dumps comprising a charge representative of the light integrated in the at least one photosensitive element, and at least one timing circuitry in communication the storage capacitor and configured for controlling the plurality of charge dumps from the at least one photosensitive element to the storage capacitor, wherein the storage capacitor and the timing circuitry cooperate to extend a full well capacity of the at least one photosensitive element; an amplifier configured to receive the accumulated charge from at least one of the plurality of circuits and to output an amplified signal having a greater strength than a strength of the charge; an analog to digital converter in communication with the amplifier to receive the amplified signal and convert the amplified signal into a digital signal; and a memory component configured to store the digital signal.

Another aspect relates to an image sensor comprising an array including a plurality of photosensitive elements; and a plurality of circuits for reading light integrated in photosensitive elements coupled thereto, each of the plurality of circuits comprising at least one storage capacitor in communication with at least one photosensitive element of the plurality of photosensitive elements, the storage capacitor having capacitance for storage of an accumulated charge representing a plurality of charge dumps from the at least one photosensitive element, each of the plurality of charge dumps comprising a charge representative of the light integrated in the at least one photosensitive element, and at least one timing circuitry in communication the storage capacitor and configured for controlling the plurality of charge dumps from the at least one photosensitive element to the storage capacitor, wherein the storage capacitor and the timing circuitry cooperate to extend a full well capacity of the at least one photosensitive element.

Another aspect relates to a pixel readout method comprising integrating light in a photodetector of a pixel for a determined integration time; for each of a plurality of charge dumps, transferring a charge representing the light integrated in the photodetector from the photodetector to a storage capacitor to extend a full well capacity of the pixel, such that the storage capacitor holds an accumulated charge representing a sum of the plurality of charge dumps; and outputting the accumulated charge from the storage capacitor for conversion to a digital signal.

Another aspect relates to an apparatus for pixel readout comprising a plurality of pixels for integrating light from a target image scene; means for reading out a plurality of charge signals from at least one pixel of the plurality of pixels, each of the charge signals representing light integrated in the at least one pixel; means for storing an accumulated charge to extend a full well capacity of each the at least one pixel, the accumulated charge representing a sum of the plurality of charge signals; means for converting the accumulated charge into a corresponding digital pixel value; and means for storing the digital pixel values.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1A:
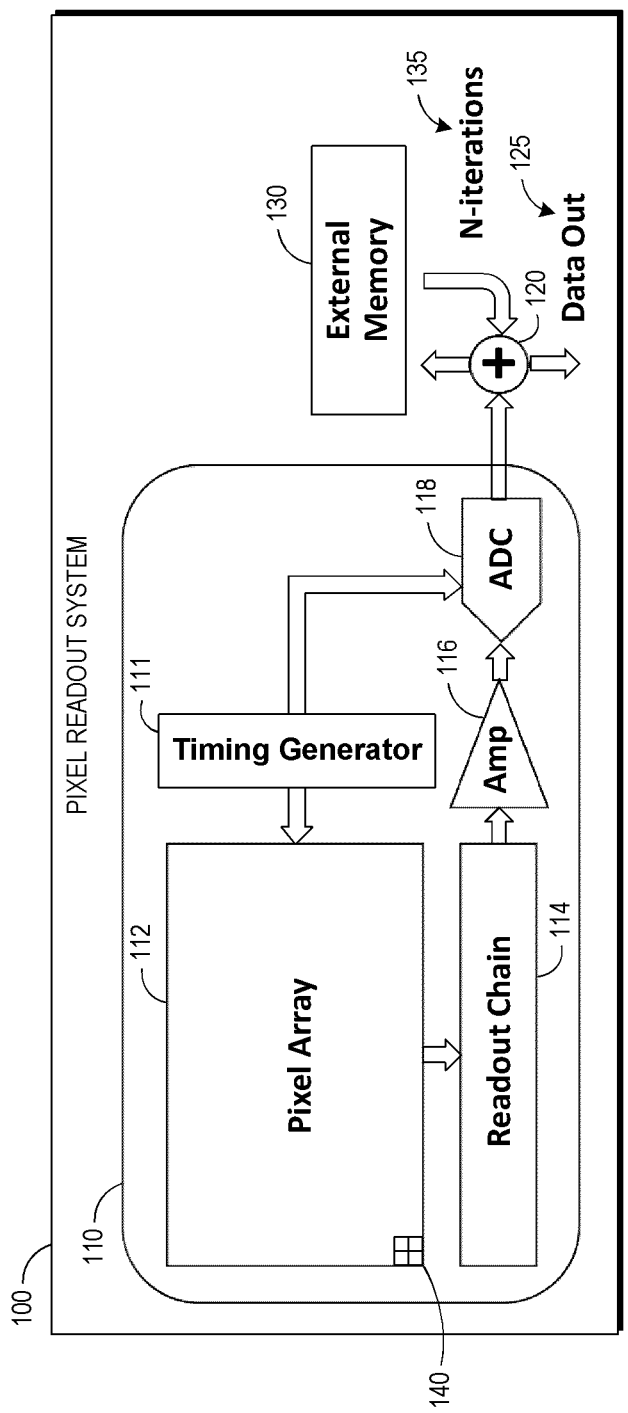
FIG. 1A illustrates an embodiment of a pixel readout system.

Embodiments of the disclosure relate to systems and techniques for full well capacity extension. For example, a pixel readout architecture including an extra storage capacitor can implement a signal readout scheme to allow extension of full well capacity, boosting SNR and dynamic range. The storage capacitor and associated readout architecture can be implemented, in various embodiments, with a four transistor 4-shared CIS pixel, 8-shared, 16-shared, or other suitable pixel configurations. Pixel readout components including a timing scheme and the storage capacitor can cooperate to store charges accumulated from the photodetectors to perform multiple pixel readouts.

In one example, where a transfer gate, timing scheme, and reset transistor are all on, a photodiode and a floating diffusion can be reset. Charge integration in the storage capacitor can occur when the transfer gate, timing scheme, and reset transistor are all off, allowing photon charge to be collected in a photodiode. When timing circuitry is turned on one or more times, the charge in the photodiode can be dumped to the storage capacitor. Accordingly, the storage capacitor can hold charges from multiple reads of a pixel or group of pixels, extending full well capacity.

In some examples, the main source of noise within a CMOS pixel is kTC (or reset) noise from the resetting of the storage capacitor and/or capacitive floating diffusion node through the resistive channel of the reset transistor (a few tens of electrons). One embodiment of a readout mode that can be implemented using embodiments of the full well capacity extension architecture described herein can include a first read performed right after reset by turning on the selector circuit. This first read can store the kTC (thermal noise) in the memory as a baseline. Such kTC noise can originate from the reset noise of capacitors, and it can be desirable for enhancing image quality to reduce, eliminate, or otherwise compensate for the kTC noise. Accordingly, a second readout can be performed after charge integration in the storage capacitor (for example including multiple charge dumps from a pixel or pixels) by turning on the selector circuit again. Due to the additional charge storage capacity of the storage capacitor and the multiple photodiode charge dumps controlled by the timing scheme, the two readouts can provide multiplication of the pixel full well capacity proportionate to the number of charge dumps. Because the kTC noise was stored in the memory as a baseline in the first frame, this readout method can compensate for the kTC noise in the second readout. By performing two readouts, for example by sampling the storage capacitor before and after the transfer gate is turned on, correlated double sampling with a short sampling time can be performed, thus eliminating kTC noise.

Another embodiment of a readout mode that can be implemented using embodiments of the full well capacity extension architecture described herein can perform multiple readouts and obtain the charge difference between two charge dumps from a photodiode. The resulting differential frame can be kTC noise free. In some embodiments, the multiple readouts can be performed in a low bit depth mode to conserve power if high accuracy is not needed, for example for a viewfinder preview image or for auto-exposure adjustments. In some embodiments, the multiple readouts can be performed in normal bit depth mode for more accurate image information. In some embodiments, for example high dynamic range (HDR) imaging, two different integration times can be used for the charge dumps in two readouts used to generate the differential frame.

Overview of Example Pixel Readout Architectures

FIG. 1A illustrates an embodiment of a pixel readout system 100 including timing circuitry 111 (also referred to as a "timing generator," a digital component though displayed within the analog component block), a set of analog components 110 including a (sensor) pixel array 112, readout circuitry 114, amplifier 116, and analog to digital converter (ADC) 118, the components 110 coupled at a bus 120 to a memory 130. Though not illustrated, the bus 120 can enable communication with other components for example an image signal processor, device memory, and readout control modules.

The pixel readout system 100 can be used for any CMOS, CCD, or other image sensor. In some embodiments, the sensor can be, for example, a 32 MP/30 fps image sensor having approximately 0.5 μm pixels with approximately 1000-e full well capacity. The image sensor can be designed to have 10b/240-fps readout speed. Some embodiments of the image sensor can be a digitally integrated design with 8-frame accumulation shutter speed, for example, implementing an interleaved rolling shutter with no need to store a full frame. In one example, data can be output from the external memory 120, for example DRAM, at speeds of approximately 12b/30-fps. Such an image sensor can result in an equivalent pixel full well capacity multiplied by a factor of eight, for example reaching approximately 8000-e full well capacity per pixel. These image sensor specifications represent just one embodiment of an image sensor using the pixel readout system 100, and other image sensors with varying specifications can be used in other embodiments.

The pixel array 112 may include a plurality of pixels 140 arranged in a predetermined number of rows and columns (e.g., M rows and N columns). Each pixel 140 represents a single photoelectric charge detecting element of the pixel array 112. Each of the plurality of pixels can each include a photosensitive element, for example a photogate, photoconductor, photodiode, or other photodetector, overlying a substrate for accumulating photo-generated charge in an underlying portion of the substrate. The pixel array 112 can, in some embodiments, include one or more filters positioned to filter incoming light, for example an infrared cut-off filter or a color filter. The photosensitive element of a CMOS pixel can be one of a depleted p-n junction photodiode or a field-induced depletion region beneath a photogate.

Timing generator 111 can provide timing signals for reading out values representing light accumulated in each of the pixels of the pixel array 112. For example, timing generator 111 can be a column and row driver. Timing generator can include control logic for controlling reset operations, exposure time, line time, and pixel time for the pixel array 112 and can also provide timing signals to the ADC 118. Readout circuitry 114 can provide circuitry for reading out each of the pixels in the pixel array 112. For example, readout circuitry 114 can include a plurality of row and column lines provided for the entire array 112. The column and row lines of the readout circuitry 114 can be electronically connected to column sample and hold (S/H) circuitry and row control circuitry, respectively, that operate according to the timing provided by the timing generator. In operation, the pixels of each row in the pixel array 112 can be turned on at the same time by a row select line and the pixels of each column can be selectively output by a column select line.

Each pixel 140 includes circuitry for reading a charge collected in each of the plurality of pixels. For example, one embodiment of the pixel circuitry is connected to each pixel and includes an output field effect transistor formed in the substrate and a charge transfer section formed on the substrate adjacent the pixel having a sensing node, typically a floating diffusion node, connected to the gate of an output transistor. A floating diffusion node (also referred to as just a floating diffusion) can be a region in active silicon that can be electrically isolated from all other nodes (for example, when charge is being stored) and the potential of such a region is determined by the amount of charge stored in it and its capacitance. Capacitance of this region is typically quite low in order to achieve high conversion gain. The charge transfer section of the pixel circuitry can include at least one electronic component, for example a transistor, for transferring charge from the underlying portion of the substrate to the floating diffusion node and another electronic component, for example a reset transistor for resetting the node to a predetermined charge level prior to charge transference. Photo charge may be amplified when it moves from the initial charge accumulation region to the floating diffusion node, and the charge at the floating diffusion node can be converted to a pixel output voltage by a source follower output transistor. As discussed in more detail below, the pixel circuitry can further include a storage capacitor or other electronic charge storage device for storing multiple charge dumps from a pixel or pixels in the analog domain. The storage capacitor may be positioned beyond the floating diffusion node in the pixel circuitry (relative to the position of the pixel) in some embodiments, and can have a capacitance greater than that of the floating diffusion node. The storage capacitor can be on the same sensor chip or in the bottom chip of a stack-die with pixel-to-pixel connection in various embodiments.

After passing through the pixel circuitry, pixel signals are passed through the amplifier 116 to increase the strength of the pixel signal (i.e., the voltage or current). The timing generator 111, pixel array 112, readout circuitry 114, and amplifier 116 together perform the functions of: (1) photon to charge conversion; (2) accumulation of image charge; (3) transfer of charge to the floating diffusion node accompanied by charge amplification; (4) resetting the floating diffusion node to a known state before the transfer of charge to it; (5) selection of a pixel for readout; and (6) output and amplification of a signal representing pixel charge. In addition, the pixel readout architecture for full well capacity extension described herein can perform functions (1) through (5) a number of times before output and amplification of the signal in order to accumulate charge in the storage capacitor in the pixel circuitry, the accumulated charge being from a number of charge dumps from one pixel or group of pixels. The accumulated charge can then be output and amplified as the signal representing the pixel charge. Using the readout architectures for full well capacity extension described herein, pixel performance indices, for example quantum efficiency, sensitivity, crosstalk, image lag, non-uniformity, and non-linearity can be optimized in the pixel design disregarding full well capacity, which is extended through the analog readout architecture.

The amplified pixel signal is passed through ADC 118 before being output from the analog components 110. Because the pixel charges are read as analog signals in the analog components 110, though digital signals and digital circuits can offer advantages as compared to analog circuits with respect to processing speed and efficient transmitting, the ADC 118 converts the analog pixel charge signals into suitable digital signals, for example into corresponding digital pixel values. The ADC 118 can convert an accumulated charge from the storage capacitor into a corresponding digital pixel value.

The digital components of the pixel readout system 100 can also function to increase the full well capacity of the pixels in the pixel array 112. In some embodiments, multiple reads can be integrated in the digital domain with reasonable power budget, effectively multiplying the small pixel's full well capacity, by leveraging embedded DRAM technology (e.g., by using DRAM as the memory 130). For example, several iterations (e.g., multiple frame capture) can be stored to memory 130. However, due to the inclusion of the storage capacitor in the pixel circuitry, charges can be dumped from the photodiode to the storage capacitor a number of times, reducing or eliminating the need for reading out multiple times per frame, saving power. Multiple reads in the digital domain can be used in conjunction with multiple dumps to the storage capacitor in the analog domain in some embodiments for additional full well capacity extension. In addition, by using N-iterations 135 of transferring accumulated charge storage to the digital memory 130, output image data 125 can be modified to reduce or eliminate kTC noise that can occur when resetting the storage capacitor. Memory 130 can be RAM, DRAM, flash memory, or any suitable type of memory for storing image data in various embodiments.

For example, a technique for reducing or eliminating kTC noise can be to store a kTC noise frame into memory as a baseline. The kTC noise can be read before dumping any charge into the storage capacitor to get its reset level, and that reset level can be stored (for example in column row circuitry). A second read can be performed after dumping pixel charges to the storage capacitor multiple times, where the second read is adjusted by the baseline. Accordingly, N-iterations can be two iterations, still achieving the full well capacity extension benefit while reducing or eliminating the effects of kTC noise. Further, only two iterations in the digital domain can be used to achieve the same full well capacity extension as multiple reads in the digital domain by dumping charges multiple times to the analog storage capacitor.

As another example, a technique for reducing or eliminating kTC noise can be to perform multiple reads and calculate the charge difference between two charge dumps from a photodiode. This may be kTC noise free. This technique can be used in some embodiments to read out in low bit depth mode to save power if high accuracy is not required (for example, a quick auto-exposure adjustment can be performed based on this technique, or preview images can be generated based on this technique). In other embodiments, the technique can be used to read out in standard or high bit depth mode for more accurate image information.

In some embodiments, two different integration times can be used for the two charge dumps in the above-described techniques for HDR imaging. In some embodiments, different integration times and/or different numbers of charge dumps to the storage capacitor can be used for different pixels in the array 112 based, for example, on charge strength or pixel intensity value, in order to extend the dynamic range of the target image scene.

Figure 1B:
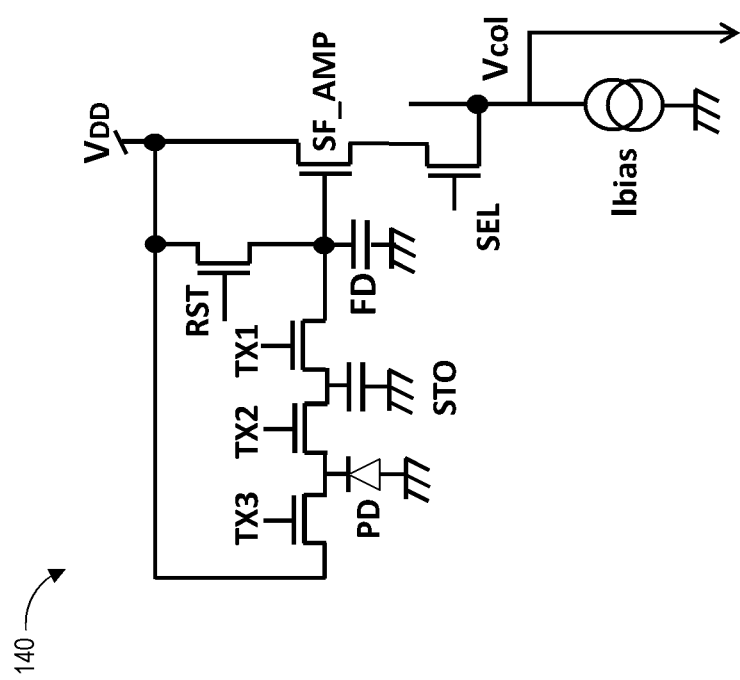
FIG. 1B illustrates an embodiment of a pixel architecture for use as a pixel of the pixel readout system of FIG. 1A.

FIG. 1B illustrates one embodiment of the pixel circuitry 140 for one pixel of the pixel readout system 100 of FIG. 1A. Many such pixels 140 are arranged in the array 112, for example forming rows and columns, but for simplicity only one is shown in greater detail. The readout circuitry embodiment of FIG. 1B can perform both low noise and lag free charge transfer as well as snap shot features, e.g., frame storage and charge sink. In addition, the storage capacitor STO offers extended full well capacity for the pixel.

The pixel circuitry includes a photodiode PD for accumulating photo-generated charge. Charge collected in the photodiode PD can be passed through transfer gate TX2 to the storage capacitor STO, and the storage capacitor STO can be provided with an effective capacitance large enough to store multiple charge dumps from the photodiode PD, for example eight or more charge dumps. The accumulated charge from the storage capacitor STO can be passed through transfer gate TX1 to the floating diffusion node FD. The selector transistor SEL allows a single row of the pixel array to be read by the image sensor. The source follower SF_AMP converts the input applied from the floating diffusion node FD into the output (e.g., voltage or current) sensed at the output node Vcol; in other words the source follower SF_AMP converts the detected image charges into corresponding electrical signals.

The reset transistor RST acts as a switch to reset the floating diffusion FD. When the reset transistor RST is turned on, the photodiode PD is effectively connected to the power supply, clearing all integrated charge. The pixel is reset when the reset transistor RST and transfer gate TX3 are turned on simultaneously, setting both the floating diffusion FD and the photodiode PD to the VDD voltage level. Turning on either of transfer gates TX2 or TX1 can set the storage capacitor STO to the VDD voltage level as well. When the transfer gate TX3 is turned off, disconnecting the photodiode and floating diffusion, the photodiode PD is left to integrate light. In addition, TX3 serves as an overflow gate for blooming protection control as well as enabling snap shot features (e.g., frame storage & charge sink), providing electronic global shuttering operation so as to freeze fast action.

In one example, to implement the first kTC noise reduction technique described above, first, the reset transistor is turned on and off to reset the floating diffusion. Signal measurement of the reset level is sampled from the floating diffusion and stored, for example on a column circuit. Next, the transfer gate TG is turned on and off which allows charge on the photodiode to transfer to the floating diffusion FD. Once charge transfer is complete, this charge (the photodiode signal level plus the floating diffusion reset level) is measured and stored on the column circuit as well. These two stored voltages are then differenced to determine the photodiode signal level, reducing kTC noise.

Figure 2:
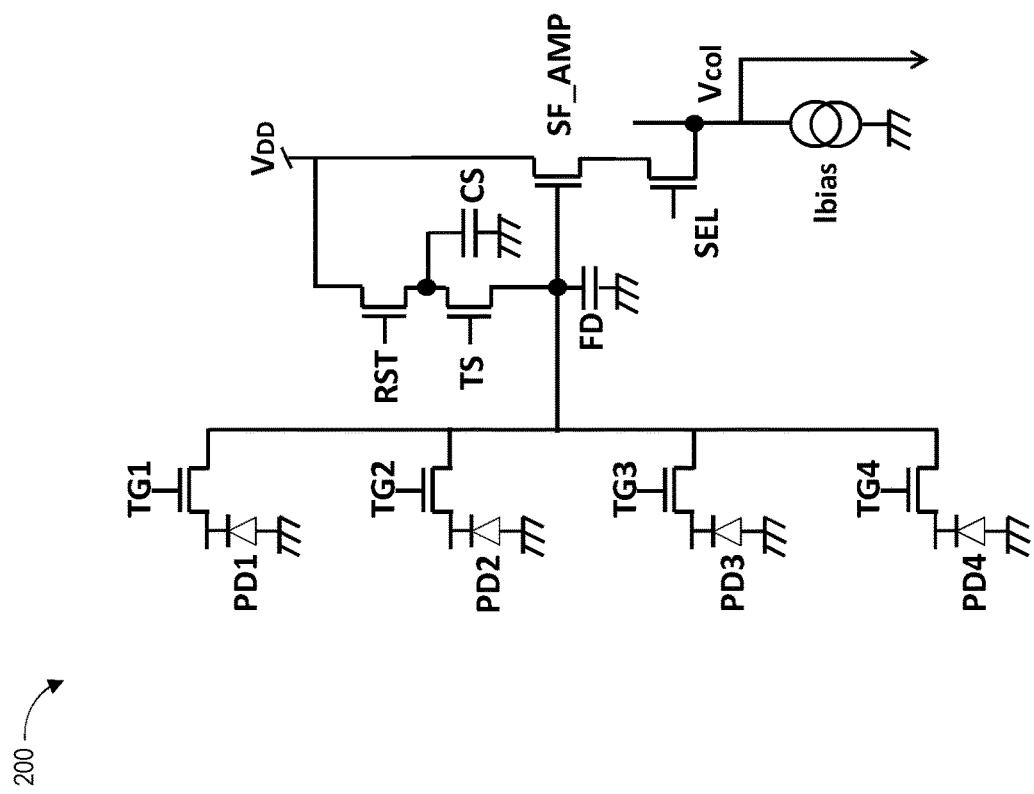
FIG. 2 illustrates an embodiment of a four transistor 4-shared image sensor pixel architecture having full well capacity extension capabilities.

FIG. 2 illustrates an embodiment of a four transistor 4-shared image sensor pixel architecture 200 having full well capacity extension capabilities. Some embodiments of the image sensor can be a solid-state image sensor, for example a CMOS image sensor, which has four four-transistor (4T) pixels sharing pixel circuitry and compact layout. The 4T 4-shared pixel architecture 200 can be used as the pixel architecture for pixels 140 in the pixel array 112 in some embodiments. The 4T 4-shared pixel architecture 200 includes four pixels, and though many such pixels are arranged in the array 112, for simplicity only one 4T 4-shared pixel architecture 200 is shown in greater detail.

The 4T 4-shared pixel architecture 200 includes four photodiodes PD1-PD4 and their corresponding transfer gates TG1-TG4, a floating diffusion node FD, reset transistor RST, voltage supply VDD, source follower amplifier SF_AMP, selector transistor SEL, output voltage node Vcol, and current source Ibias. These elements can perform similar functions as described above with respect to FIG. 1B. The 4T 4-shared pixel architecture 200 also includes timing circuitry TS connected in series with the floating diffusion FD and a storage capacitor CS connected in series with the timing circuitry TS. Sharing of the floating diffusion FD, source follower amplifier SF_AMP, row select transistor SEL, timing circuitry TS, reset transistor RST, and storage capacitor CS between adjacent photodiodes PD1-PD4 and transfer gates TG1-TG4 assists in increasing the fill factor of the pixel architecture. The illustrated architecture 200 results in approximately 2.0 transistors per pixel. Components can be shared by four separate photodiodes and associated transfer gates. In some embodiments, photodiodes PD1-PD4 can include one photodiode used to detect a red component of incoming light, two photodiodes used to detect a green component of incoming light, and one photodiode used to detect a blue component of incoming light.

Charge can be collected by each of the photodiodes PD1-PD4 as long as the corresponding transfer gate TG1-TG4 is off, and the charge is transferred to the floating diffusion FD by turning on the corresponding transfer gate TG1-TG4 after the integration time. The floating diffusion FD can be a parasitic capacitor inside the silicon wafer of the photodiodes PD1-PD4, however this may not hold enough charge for extending the dynamic range of a sensor with small pixels. Accordingly, the charge from a photodiode PD1-PD4 can be read out multiple times through the floating diffusion FD to the storage capacitor CS. The storage capacitor CS can be configured with an effective capacitance large enough to store multiple charge dumps from a photodiode, for example eight or more charge dumps. In some embodiments, the capacitance of the storage capacitor is greater than or equal to approximately 3.2 femtofarads. Accordingly, the full well capacity of a pixel can be effectively multiplied in the analog domain by the number of charge dumps stored in the storage capacitor CS.

In one example, where a transfer gate TG1-TG4, timing circuitry TS, and reset transistor RST are all on, a corresponding photodiode PD1-PD4 and the floating diffusion FD can be reset. Charge integration can occur when the transfer gate TG1-TG4, timing circuitry TS, and reset transistor RST are all off, allowing photon charge to be collected in a corresponding photodiode PD1-PD4. By selectively turning on a transfer gate TG1-TG4, the charge in a corresponding photodiode (e.g., the one or more photodiodes having an associated transfer gate turned on) is transferred to the floating diffusion FD. When the timing circuitry TS is turned on one or more times, from the floating diffusion FD can be dumped to the storage capacitor CS. In some embodiments, one or more transfer gates and the timing circuitry can be turned on simultaneously to transfer charge directly from associated photodiodes directly to the storage capacitor CS.

During the charge readout of one of photodiodes PD1-PD4, all the photoelectrons are mixed at the floating diffusion node FD and integrated storage capacitor CS by turning both the corresponding transfer gate of transfer gates TG1-TG4 and timing circuitry TS on. Then the signal is read out after turning the corresponding transfer gate off. After turning the corresponding transfer gate off, the charge sensing node capacitance (that can be input to the SF_AMP's gate) is the combination of capacitors of the floating diffusion FD, storage capacitor CS, and timing circuitry TS. All the charges integrated at the photodiode, floating diffusion FD, and storage capacitor CS are mixed up followed by readout via the source follower amplifier SF_AMP. This process performs charge-to-voltage conversion, and the V_FD and V_col represent the voltage level at FD and column video bus respectively. The voltage levels at the floating diffusion FD and at V_col may depend upon the incident light level, that is, a number of photons incident on the photodiodes PD1-PD4.

The timing circuitry TS can include high-speed logic for determining which of the photodiodes PD1-PD4 to read for accumulation of charge in the storage capacitor CS. The high-speed logic of the timing circuitry TS can also regulate the number of charge dumps sent from a photodiodes PD1-PD4 to the storage capacitor CS. By accumulating multiple charge dumps from a pixel in the analog domain, device power can be saved in comparison to accumulating multiple charge dumps from the pixel in the digital domain. Sequential readout of photodiodes PD1-PD4 using the timing circuitry TS can control the readout of photodiodes PD1-PD4 to increase resolution in comparison to parallel scanning. Due to the high speed logic of the timing circuitry TS, high video frame rates (e.g., 30 fps at 8 MP full resolution) can still be achieved while sampling each photodiode in the pixel array multiple times in the analog domain, for example eight readouts per pixel per frame. In some embodiments, the timing scheme can be a transistor with a line weight of approximately 20 nm.

One readout mode implemented using the architecture of FIG. 2 can include a first read performed right after reset by turning on the selector SEL circuit. This can store the kTC (thermal noise) in the memory as a baseline. A second readout can be performed after charge integration in the storage capacitor by turning on the selector circuit again. Due to the additional capacity of the storage capacitor and the multiple photodiode charge dumps controlled by the timing scheme, the two readouts can provide multiplication of the pixel full well capacity proportionate to the number of charge dumps.

Another readout mode implemented using the architecture of FIG. 2 can perform multiple readouts and obtain the charge difference between two "charge dumps" from a photodiode. The resulting differential frame can be kTC noise free. The multiple readouts can be performed in a low bit depth mode to save power if high accuracy is not needed, for example for a viewfinder preview image or for auto-exposure adjustments. The multiple readouts can be performed in normal bit depth mode for more accurate image information. In some embodiments, for example high dynamic range (HDR) imaging, two different integration times can be used for the charge dumps in two readouts used to generate the differential frame.

Figure 3:
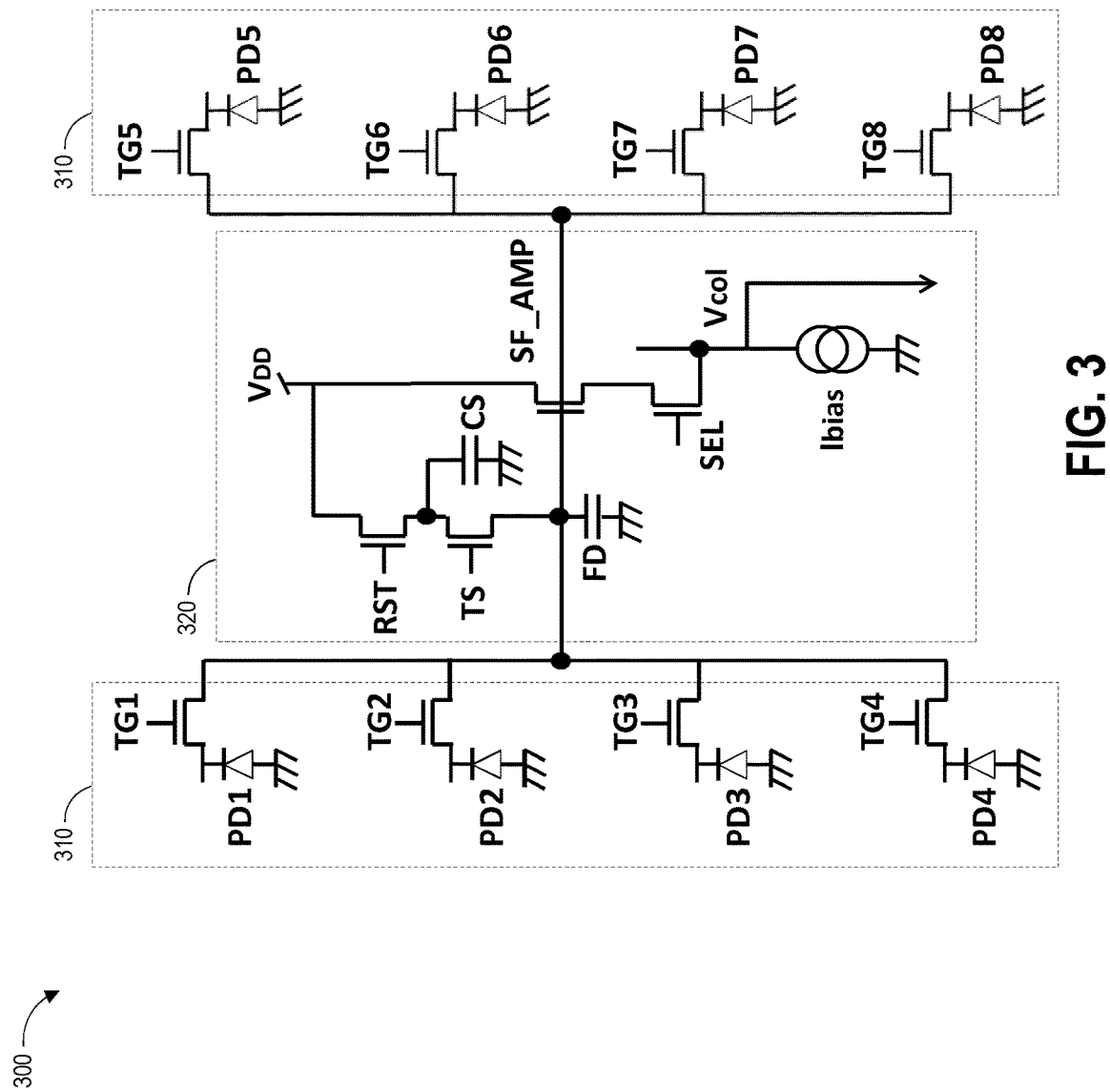
FIG. 3 illustrates an embodiment of a four transistor 8-shared image sensor pixel architecture having full well capacity extension capabilities.

FIG. 3 illustrates an embodiment of a four transistor 8-shared image sensor pixel architecture 300 having full well capacity extension capabilities. Some embodiments of the image sensor can be a solid-state image sensor, for example a CMOS image sensor, which has eight 4T pixels sharing pixel circuitry and compact layout. The 4T 8-shared pixel architecture 300 can be used as the pixel architecture for pixels in the pixel array 112 in some embodiments. The 4T 8-shared pixel architecture 300 includes eight pixels, and though many such pixels are arranged in the array 112, for simplicity only one 4T 8-shared pixel architecture 300 is shown in greater detail.

The 4T 8-shared pixel architecture 300 includes eight photodiodes PD1-PD8 and their corresponding transfer gates TG1-TG8, a floating diffusion node FD, reset transistor RST, timing circuitry TS, storage capacitor CS, voltage supply VDD, source follower amplifier SF_AMP, selector transistor SEL, output voltage node Vcol, and current source Ibias. These components can perform similar functions as described above with respect to FIG. 2. These components can be shared by eight separate photodiodes and associated transfer gates. Sharing of the floating diffusion FD, source follower amplifier SF_AMP, row select transistor SEL, timing circuitry TS, reset transistor RST, and storage capacitor CS between adjacent photodiodes PD1-PD8 and transfer gates TG1-TG8 assists in increasing the fill factor of the pixel architecture. The illustrated architecture 300 results in approximately 1.5 transistors per pixel. In some embodiments, photodiodes PD1-PD8 can include two photodiodes used to detect a red component of incoming light, four photodiodes used to detect a green component of incoming light, and two photodiodes used to detect a blue component of incoming light.

As described above, the timing circuitry TS can include high-speed logic configured to control accumulation of one or more charge dumps from a photodiode PD1-PD8 in the storage capacitor CS for power-efficient extension of the small pixel's full well capacity in the analog domain. The accumulated charge can be read out from the storage capacitor CS through the source follower SF_AMP to the output voltage node Vcol.

FIG. 3 also illustrates one embodiment of partitioning of the pixel array and read-out circuitry into separate, stacked structures (e.g., silicon wafers). For example, a first portion 310 including the photodiodes PD1-PD8, the corresponding transfer gates TG1-TG8, and the floating diffusion node FD can be placed in a photodetector wafer configured to integrate charge from incoming light. A second portion 320 including the reset transistor RST, timing circuitry TS, storage capacitor CS, voltage supply VDD, source follower amplifier SF_AMP, selector transistor SEL, output voltage node Vcol, and current source Ibias can be placed in a pixel readout circuitry wafer. Accordingly, the surface space for detecting light can be increased through both the space-saving design of the shared pixel architecture as well as the separation of the photodiodes and the pixel readout circuitry into different wafers. The timing circuitry TS and source follower amplifier SF_AMP of the pixel readout circuitry wafer can be connected to the floating diffusion FD of the photodetector wafer.

Figure 4:
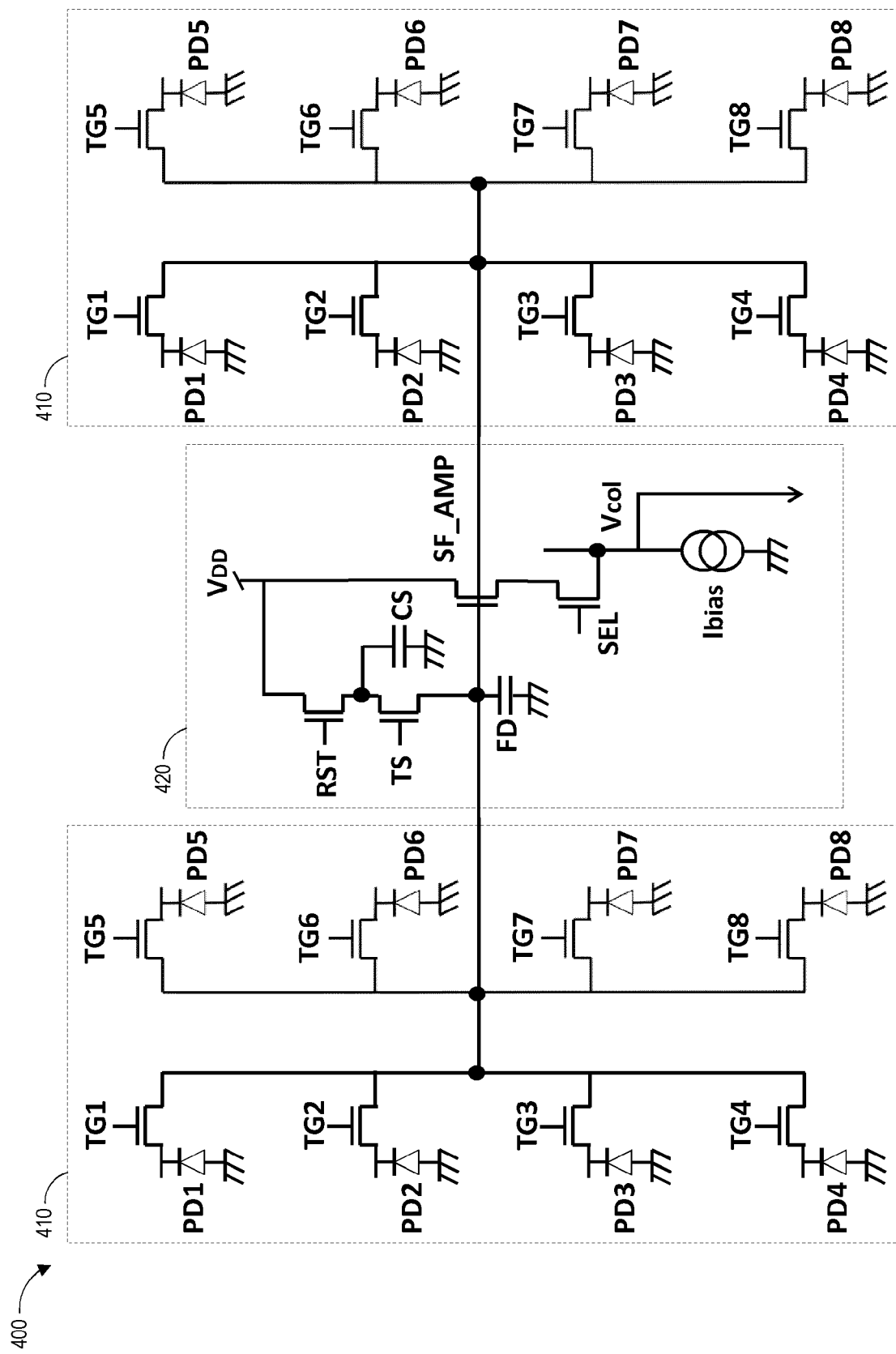
FIG. 4 illustrates an embodiment of a four transistor 16-shared image sensor pixel architecture having full well capacity extension capabilities.

FIG. 4 illustrates an embodiment of a four transistor 16-shared image sensor pixel architecture 400 having full well capacity extension capabilities. Some embodiments of the image sensor can be a solid-state image sensor, for example a CMOS image sensor, which has sixteen 4T pixels sharing pixel circuitry and compact layout. The 4T 16-shared pixel architecture 400 can be used as the pixel architecture for pixels in the pixel array 112 in some embodiments. The 4T 16-shared pixel architecture 400 includes sixteen pixels, and though many such pixels are arranged in the array 112, for simplicity only one 4T 16-shared pixel architecture 400 is shown in greater detail.

The 4T 16-shared pixel architecture 400 includes sixteen photodiodes PD1-PD16 and their corresponding transfer gates TG1-TG16, a floating diffusion node FD, reset transistor RST, timing circuitry TS, storage capacitor CS, voltage supply VDD, source follower amplifier SF_AMP, selector transistor SEL, output voltage node Vcol, and current source Ibias. These elements can perform similar functions as described above with respect to FIG. 2. These components can be shared by the sixteen separate photodiodes and associated transfer gates. Sharing of the floating diffusion FD, source follower amplifier SF_AMP, row select transistor SEL, timing circuitry TS, reset transistor RST, and storage capacitor CS between adjacent photodiodes PD1-PD16 and transfer gates TG1-TG16 assists in increasing the fill factor of the pixel architecture. The illustrated architecture 400 results in approximately 1.0 transistors per pixel. In some embodiments, photodiodes PD1-PD16 can include four photodiodes to detect a red component of incoming light, eight photodiodes to detect a green component of incoming light, and four photodiodes to detect a blue component of incoming light.

As described above, the timing circuitry TS can include high-speed logic configured to control accumulation of one or more charge dumps from a photodiode PD1-PD16 in the storage capacitor CS for power-efficient extension of the small pixel's full well capacity in the analog domain. The accumulated charge can be read out from the storage capacitor CS through the source follower SF_AMP to the output voltage node Vcol.

FIG. 4 also illustrates one embodiment of partitioning of the pixel array and read-out circuitry into separate, stacked structures (e.g., silicon wafers). For example, a first portion 410 including the photodiodes PD1-PD16, the corresponding transfer gates TG1-TG16, and the floating diffusion node FD can be placed in a photodetector wafer configured to integrate charge from incoming light. A second portion 420 including the reset transistor RST, timing circuitry TS, storage capacitor CS, voltage supply VDD, source follower amplifier SF_AMP, selector transistor SEL, output voltage node Vcol, and current source Ibias can be placed in a pixel readout circuitry wafer. Accordingly, the surface space for detecting light can be increased through both the space-saving design of the shared pixel architecture as well as the separation of the photodiodes and the pixel readout circuitry into different wafers. The timing circuitry TS and source follower amplifier SF_AMP of the pixel readout circuitry wafer can be connected to the floating diffusion FD of the photodetector wafer.

FIGS. 1B, 2, 3, and 4 illustrate various pixel circuitry architectures that can be used to extend the full well capacity of small pixels. In some embodiments, having even numbers of shared pixels and/or multiples of four shared pixels can provide for a more compact image sensor layout, pixel symmetry, uniformity of pixel structure, and noise suppression. These examples are provided to illustrate, and not to limit, the full well capacity extension capabilities of the storage capacitor CS and timing circuitry TS. In other embodiments, other numbers of shared pixels (e.g., 32) or other pixel architectures including fewer or greater numbers of transistors per pixel (e.g., 3T, 5T, etc.) can be used together with the storage capacitor CS and timing circuitry TS to extend pixel full well capacity in the analog domain.

Overview of Example Pixel Readout Techniques

Figure 5A:
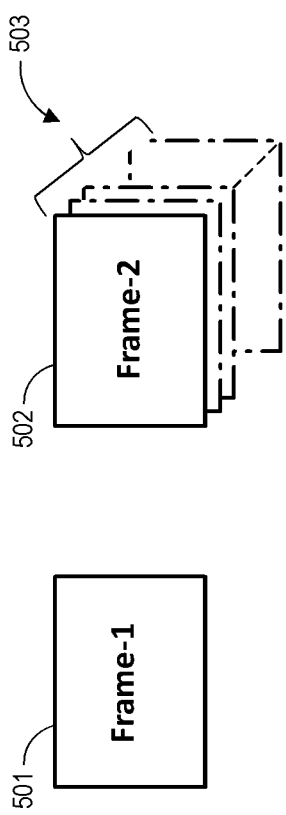
FIG. 5A is a schematic diagram illustrating an embodiment of multiple reads for full well capacity extension.

FIG. 5A is a schematic diagram illustrating an embodiment of multiple reads for full well capacity extension. Frame-1 501 represents the baseline kTC noise of a storage capacitor, for example by reading out the charge in a storage capacitor in the pixel readout architecture after reset. Frame-2 502 represents image data acquired through a plurality of charge dumps 503 from each pixel, for example by using the storage capacitor in the pixel readout architecture to enable accumulation of a plurality of charge dumps 503 from each pixel in the analog domain.

Figure 5B:
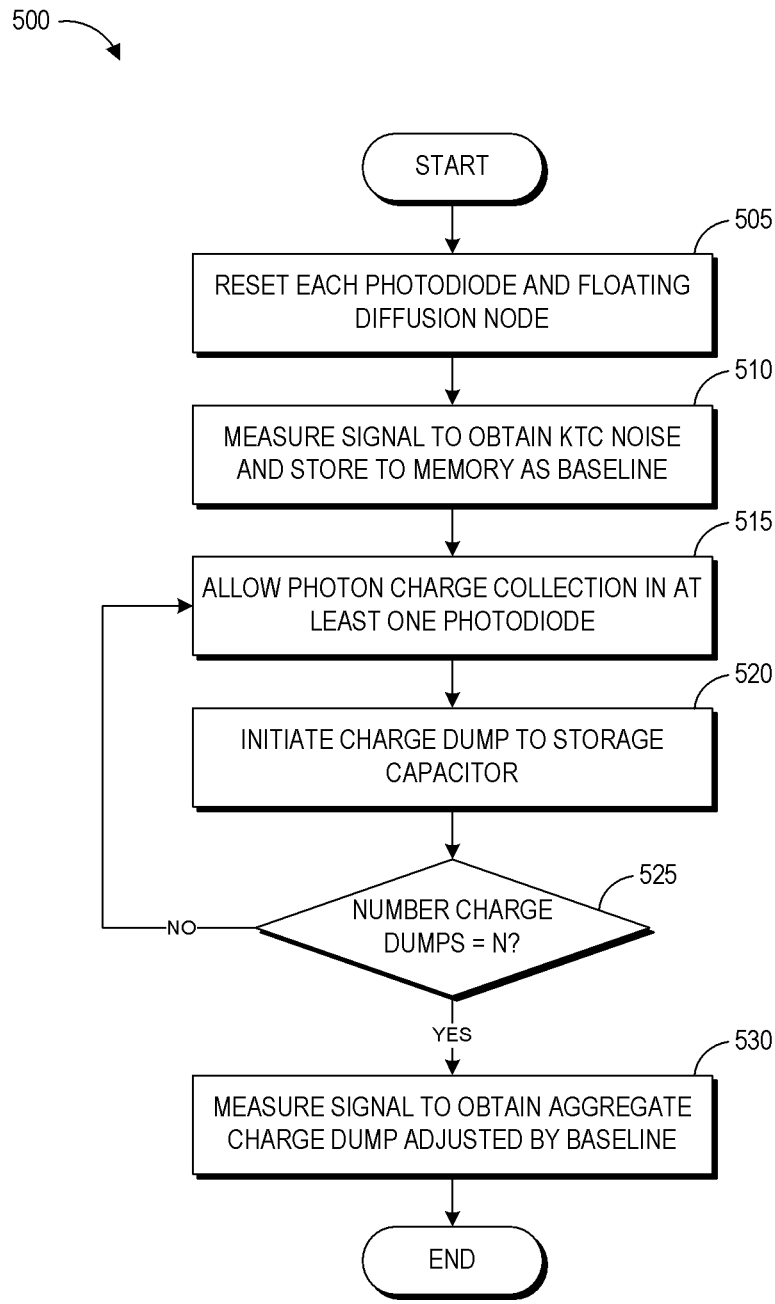
FIG. 5B illustrates a flowchart of an embodiment of a kTC noise compensation process implementing the reads of FIG. 5A.

FIG. 5B illustrates a flowchart of an embodiment of a kTC noise compensation process 500 implementing the readouts of FIG. 5A. In some embodiments of the readout architectures described above, the main source of noise within a pixel is kTC (or reset) noise from the resetting of the capacitive floating diffusion node through the resistive channel of the reset transistor. Such kTC noise can range from a few electrons to 100 electrons or more, and can accordingly affect the value read from the pixels of an image sensor. The kTC noise compensation process 500 represents one embodiment of a readout mode that can be implemented using embodiments of the full well capacity extension architectures described herein to minimize or eliminate the effects of kTC noise.

Figure 5C:
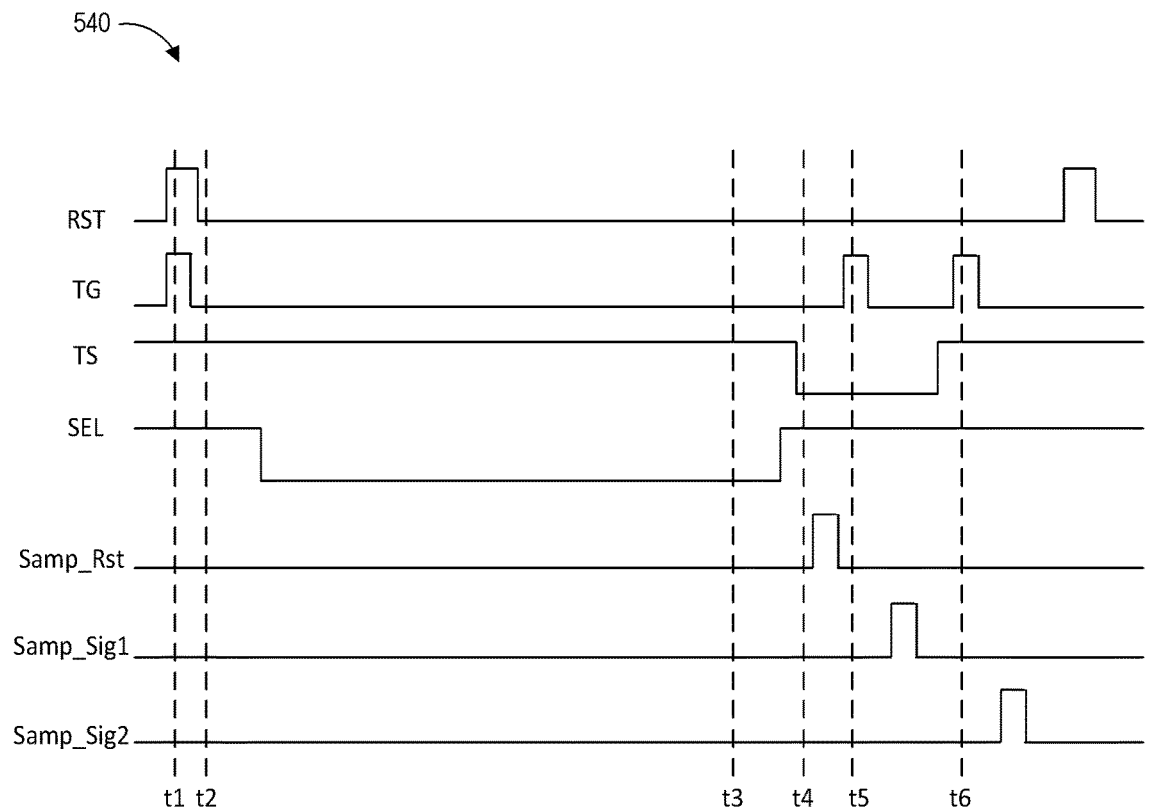
FIG. 5C illustrates an example timing scheme for turning pixel architecture components on and off to perform the process of FIG. 5B.
Figure 5D:
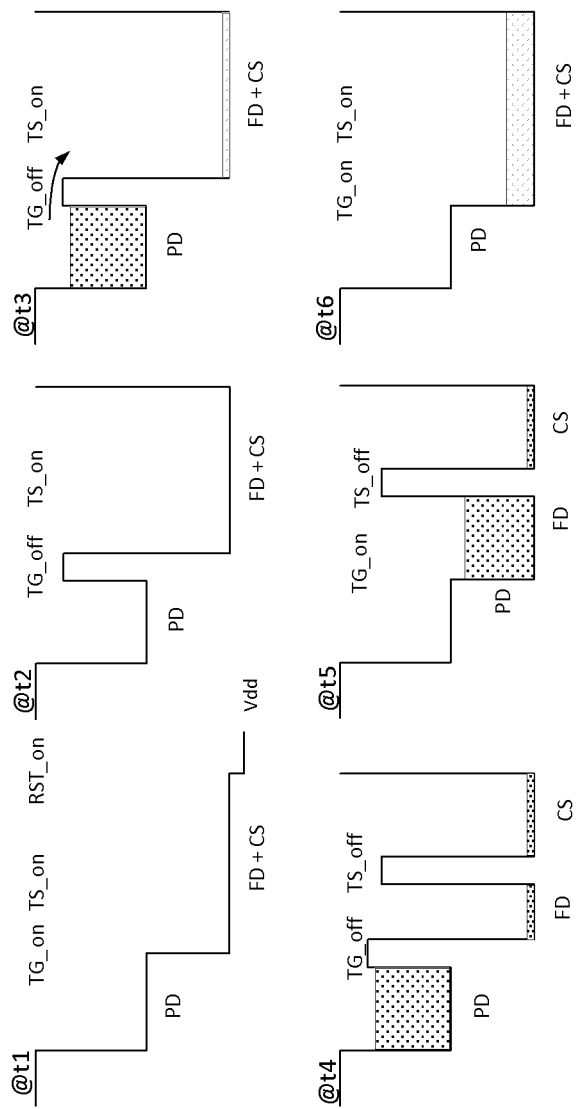
FIG. 5D illustrates a graphical representation of charge flow between pixel architecture components during the timing scheme of FIG. 5C.

FIG. 5C illustrates an example timing scheme 540 with six timing points t1-t6 for turning pixel architecture components on and off to perform the process of FIG. 5B. The timing scheme 540 can be used to accomplish a pixel readout process having six steps in accordance with the timing points: (t1) Reset photo-detector/FD/CS; (t2) Reset off, light exposure, & charge integration starts; (t3) During charge integration of exposure, non-saturated charges stay in PD, & all saturated charges overflow to FD & CS via TG & TS; (t4) After the integration, TS is shut off; signal charges are spilt into FD & CS; (t5) Photon-generated charges are transferred to FD as TG switched on, & readout after TG is set off; and (t6) Multiple-dump signal charges occurs between t5 & t6, and all charges are collected at the FD+CS. FIG. 5D illustrates graphical representations of charge flow between pixel architecture components corresponding to the timing points t1-t6 of the timing scheme 540 of FIG. 5C. Accordingly, FIGS. 5C and 5D will be discussed in conjunction with the process 500 of FIG. 5B.

At block 505, the process 500 resets a photodiode and floating diffusion node in the pixel array and pixel circuitry, for example by turning on a transfer gate, timing scheme, and reset transistor. This effectively clears any integrated charge from the photodiode and floating diffusion node. Block 505 corresponds to the timing point t1 in the timing scheme 540 and the charge flow diagram labeled "@t1" of FIG. 5D. As illustrated, the reset transistor RST, transfer gate TG, and timing circuitry TS, and selector SEL are turned on so all charge in the photodiode PD, floating diffusion FD, and storage capacitor CS can flow to the voltage level Vdd.

At block 510, the charge in the storage capacitor and floating diffusion connected in parallel is read out through the floating diffusion node (e.g., frame-1 501) by turning on the selector circuit. This read can store the kTC in a memory as a baseline. Block 510 corresponds to the timing point t2 in the timing scheme 540 and the charge flow diagram labeled "@t2" of FIG. 5D. As illustrated, the reset transistor RST, timing circuitry TS, and selector SEL are on and the transfer gate TG is off so that the charge in the floating diffusion FD and storage capacitor CS can be sampled.

At block 515, the process 500 allows photon charge collection in a photodiode for a determined integration time, often referred to as the exposure time. For example, the transfer gate, timing circuitry, and reset transistor associated with the photodiode can be turned off to allow photon charge collection in the photodiode. In a CMOS sensor, the integration time can be dynamically selected per pixel to extend dynamic range in some embodiments. Block 515 corresponds to the timing point t3 in the timing scheme 540 and the charge flow diagram labeled "@t3" of FIG. 5D. As illustrated, the reset transistor RST, transfer gate TG, and selector SEL are off and the timing circuitry TS is on so charge can collect in the photodiode PD. As illustrated in FIG. 5D, any oversaturated charge from the photodiode PD spills over into the floating diffusion FD and storage capacitor CS instead of into neighboring pixels.

At block 520, the process 500 can initiate charge dump from the photodiode to the storage capacitor. For example, in some embodiments the transfer gate associated with the photodiode can be turned on to transfer the charge to the storage capacitor. In some embodiments, the transfer gate associated with the photodiode can be turned on to transfer the charge to the floating diffusion, and then the timing circuitry can be turned on to transfer the charge from the floating diffusion to the storage capacitor. In some embodiments, the transfer gate associated with the photodiode and the timing circuitry can be turned on simultaneously to transfer the charge from the photodiode through the floating diffusion to the storage capacitor. Block 515 corresponds to the timing points t4-t6 in the timing scheme 540 and the charge flow diagrams labeled "@t4," "@t5," and "@t6" of FIG. 5D. As illustrated, at timing point t4 the reset transistor RST, timing circuitry TS, and transfer gate TG are all off. At timing point t5 the transfer gate TG is turned on to allow charge to flow from the photodiode PD to the floating diffusion FD. At timing point t6 the timing circuitry t6 is turned on to allow charge to flow between the floating diffusion FD and storage capacitor CS connected in parallel, such that the storage capacitor CS allows for collection of a greater amount of charge. Timing points t3 through t6 can be repeated for the desired number of charge dumps.

At block 525, the process 500 can determine whether the number of charge dumps from the photodiode to the storage capacitor is equal to N. In some embodiments, N represents a predetermined number of charge dumps, for example 2, 4, 8, or more, depending on the full well capacity extension needed for the pixels of the image sensor. In some embodiments, N can be a dynamically determined number of charge dumps, for example based on a charge value corresponding to a desired intensity range for the pixels of the image sensor. The number N of charge dumps is controlled via the timing circuitry TS, and is performed between timing point t5 and timing point t6 in the pixel operation timing diagram. In some examples, N can be determined by Automatic Exposure Control (AEC) in sensor timing control logic.

If, at block 525, the process 500 determines that the number of charge dumps is equal to N, then the process 500 loops back to block 515 to allow photon charge collection in the photodiode for a determined integration time. The process 500 transitions through blocks 520 and 525 to perform the charge dump to the storage capacitor as described above.

If, at block 525, the process 500 determines that the number of charge dumps is equal to N, then the process 500 transitions to block 530 to measure the charge from the storage capacitor (e.g., frame-2 502) by turning on the selector circuit again. Accordingly, this second readout can be performed after charge integration in the storage capacitor including accumulation of multiple charge dumps from a pixel. Due to the additional charge storage capacity of the storage capacitor and the multiple photodiode charge dumps controlled by the timing scheme, the frame-2 502 readout can provide multiplication of the pixel full well capacity proportionate to the number N of charge dumps. The reset value of the storage capacitor (frame-1 501) can be removed from the signal voltage of the pixel (frame-2 502). Because the kTC noise was stored in the memory as a baseline in the first frame, this readout method can compensate for (e.g., reduce or eliminate) the kTC noise in the second readout. The floating diffusion FD serves as the in-pixel memory to enable analog correlated double sampling (CDS) in a pixel cell not including the timing circuitry TS and the storage capacitor CS. The addition of the timing circuitry TS and storage capacitor CS induce additional reset kTC noise, and some embodiments rely on the digital CDS described herein to eliminate such additional kTC noise.

Figure 6A:
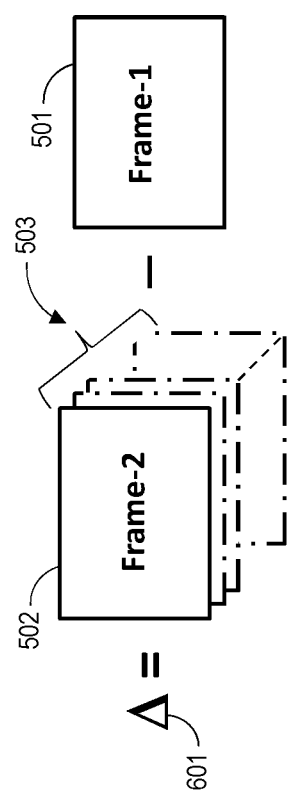
FIG. 6A is a schematic diagram illustrating an embodiment of multiple reads for full well capacity extension.

FIG. 6A is a schematic diagram illustrating an embodiment of multiple reads for full well capacity extension. As described above with respect to FIGS. 5A and 5B, frame-1 501 represents the baseline kTC noise of a storage capacitor, for example by reading out the charge in a storage capacitor in the pixel readout architecture after reset. Frame-2 502 represents image data acquired through a plurality of charge dumps 503 from each pixel, for example by using the storage capacitor in the pixel readout architecture to enable accumulation of a plurality of charge dumps 503 from each pixel in the analog domain. Difference 601 represents the differential frame calculated by subtracting the kTC noise as represented by the value of frame-1 501 from the accumulated integrated charge value as represented by frame-2 502.

Figure 6B:
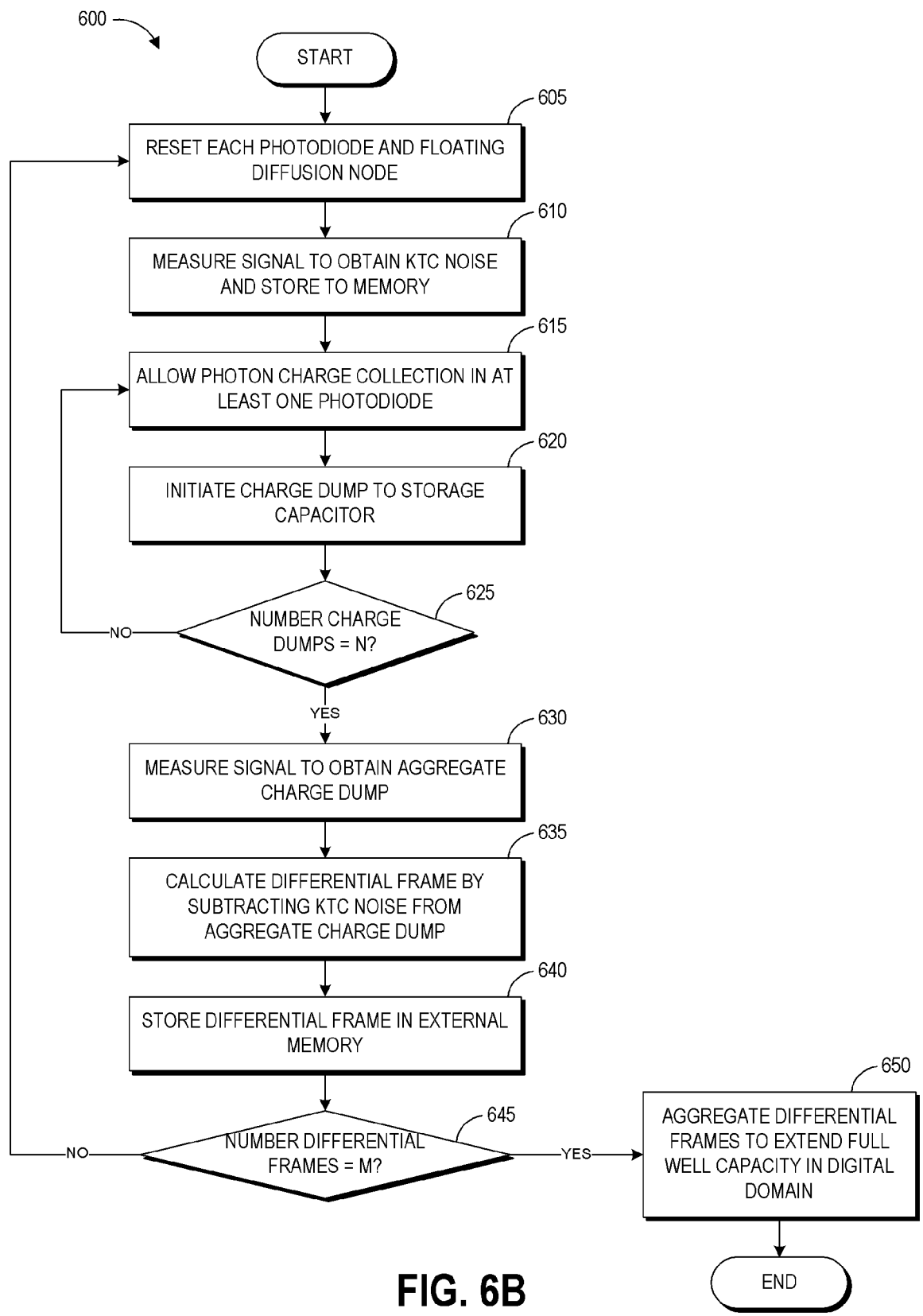
FIG. 6B illustrates a flowchart of an embodiment of a kTC noise compensation process implementing the reads of FIG. 6A.

FIG. 6B illustrates a flowchart of an embodiment of a kTC noise compensation process 600 implementing the readouts of FIG. 6A. Blocks 605 through 625 correspond to blocks 505 through 525, respectively, of process 500 as described above for obtaining values for frame-1 501 and frame-2 502, where the value of frame-2 502 represents N charge dumps from a pixel into the storage capacitor. Accordingly, the description will not be repeated here for brevity.

At block 630, the process 600 can measure the charge from the storage capacitor to determine the value of frame-2 502 by turning on the selector circuit again. This value of frame-2 502 may be stored to the memory or transmitted together with frame-1 501 for calculation of the differential frame 601.

At block 635, the process 600 can calculate the value of the differential frame 601 by subtracting the value of the kTC noise as represented by frame-1 501 from the signal voltage of the pixel (e.g., accumulated integrated charge dumps from the storage capacitor) as represented by frame-2 502. Accordingly, the differential frame 601 can be free or substantially free from kTC noise.

At block 640, the process 600 can store the differential frame in an external memory. For example, the external memory can be the memory 130 of the pixel readout system 100 described above.

At block 645, the number of differential frames stored in the external memory can be compared to a threshold M. The threshold M can represent a predetermined or dynamically determined number of differential frames in various embodiments. If, at block 645, the process 600 determines that the number of differential frames is less than M, then the process 600 can loop back through blocks 605 through 640 to generate an additional differential frame for storage in the memory.

If, at block 645, the process 600 determines that the number of differential frames is equal to M, then the process 600 can transition to block 650. At block 650, the process 600 (for example, by using an image signal processor) may aggregate the differential frames to further extend the pixel full well capacity. This further extension of the full well capacity occurs in the digital domain (for example, after the photodiode charge has been converted from an analog to a digital value), in contrast to the full well capacity extension in the analog domain provided by the multiple charge dumps to the storage capacitor.

In some embodiments, the M differential frames can be generated in a low bit depth mode to conserve power if high accuracy is not needed, for example for a viewfinder preview image or for auto-exposure adjustments. In some embodiments, the M differential frames can be generated in normal bit depth mode for more accurate image information. In some embodiments, M=2 and accordingly two differential frames are captured. The two differential frames can be captured using different integration times, which can provide advantages in some imaging applications, for example high dynamic range (HDR) imaging.

Overview of Example Imaging Device

Figure 7:
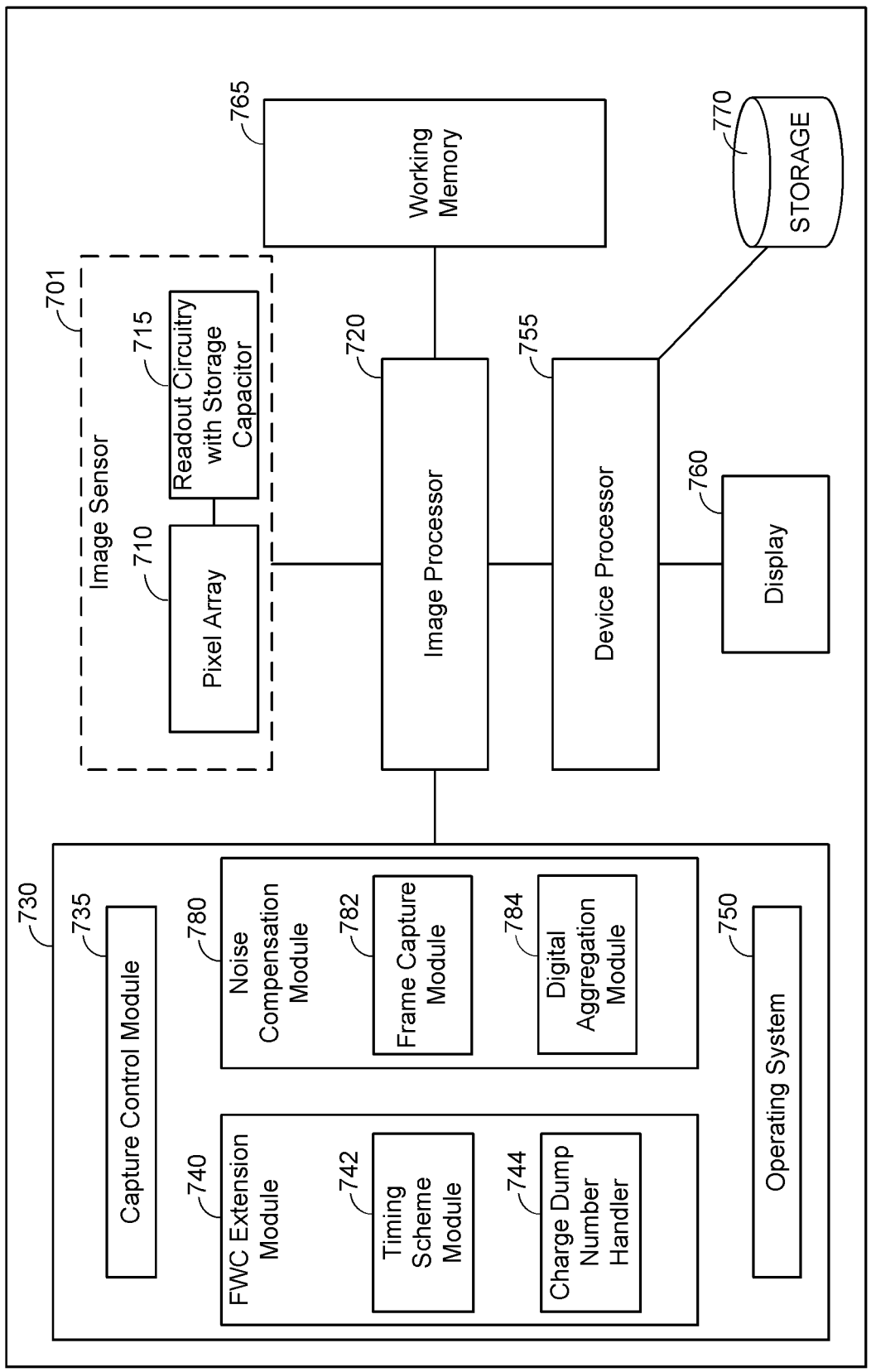
FIG. 7 illustrates a high-level schematic diagram of an embodiment of an image capture device with full well capacity extension capabilities.

FIG. 7 illustrates a high-level schematic diagram of an embodiment of an image capture device 700 with full well capacity extension capabilities, the device 700 having a set of components including an image processor 720 linked to a camera 701 (image sensor). The image processor 720 is also in communication with a working memory 765, memory 730, and device processor 755, which in turn is in communication with storage 770 and an optional electronic display 760.

Device 700 may be a portable personal computing device, e.g. a mobile phone, digital camera, tablet computer, personal digital assistant, or the like. There are many portable computing devices in which using the full well capacity extension techniques as described herein would provide advantages, particularly as the image sensors in such devices trend toward smaller pixels with more limited full well capacity. Device 700 may also be a stationary computing device or any device in which the full well capacity extension techniques would be advantageous. A plurality of applications may be available to the user on device 700. These applications may include traditional photographic and video applications as well as applications specific to full well capacity extension, for example applications relating to user management of number of charge dumps, number of differential frames, HDR imaging applications, and the like.

The image capture device 700 includes camera 701 for capturing external images. The camera 701 can include a pixel array 710 and pixel circuitry with additional storage capacitor 715 as described above. In accordance with the full well capacity extending architectures described above, the storage capacitor can have the capacitance to store a number of charge dumps from one or more pixels, thereby extending pixel full well capacity in the analog domain. The camera 701 can be configured for continuous or intermittent capture of preview frames, as well as capture of full resolution final images.

The image processor 720 may be configured to perform various processing operations on received preview frames in order to execute full well capacity extension techniques. Processor 720 may be a general purpose processing unit or a processor specially designed for imaging applications. Examples of image processing operations include AWB and AEC data generation, LED current calculation, cropping, scaling (e.g., to a different resolution), image stitching, image format conversion, color interpolation, color processing, image filtering (e.g., spatial image filtering), lens artifact or defect correction, etc. Processor 720 may, in some embodiments, comprise a plurality of processors. Processor 720 may be one or more dedicated image signal processors (ISPs) or a software implementation of a processor.

As shown, the image processor 720 is connected to a memory 730 and a working memory 765. In the illustrated embodiment, the memory 730 stores capture control module 735, full well capacity extension module 740, noise compensation module 780, and operating system 750. The modules of the memory 730 include instructions that configure the image processor 720 of device processor 755 to perform various image processing and device management tasks. Working memory 765 may be used by image processor 720 to store a working set of processor instructions contained in the modules of memory 730. Alternatively, working memory 765 may also be used by image processor 720 to store dynamic data created during the operation of device 700.

Full well capacity extension module 740 can store sub-modules timing scheme module 742 and charge dump number handler module 744. Together, these modules can cooperate to perform the tasks relating to determining each pixel's integration time and multiple charge dumps from the pixel to the storage capacitor in the readout architecture.

Noise compensation module 780 can store sub-modules frame capture module 782 and digital aggregation module 784. In some embodiments, frame capture module 782 can be provided with instructions that configure the processor 720 to perform the process 500 described above by providing instructions to the pixel circuitry of the image sensor. In some embodiments, digital aggregation module 784 can be provided with instructions that configure the processor 720 to perform the process 600 described above to aggregate multiple charges in the digital domain.

As mentioned above, the image processor 720 is configured by several modules stored in the memories. The capture control module 735 may include instructions that configure the image processor 720 to adjust the focus position of camera 701. Capture control module 735 may further include instructions that control the overall image capture functions of the device 700. For example, capture control module 735 may include instructions that call subroutines to configure the image processor 720 to capture preview image data or full resolution image data including one or more frames of a target image scene using the camera 701.

Operating system module 750 configures the image processor 720 to manage the working memory 765 and the processing resources of device 700. For example, operating system module 750 may include device drivers to manage hardware resources for example the camera 701. Therefore, in some embodiments, instructions contained in the image processing modules discussed above may not interact with these hardware resources directly, but instead interact through standard subroutines or APIs located in operating system component 750. Instructions within operating system 750 may then interact directly with these hardware components. Operating system module 750 may further configure the image processor 720 to share information with device processor 755.

Device processor 755 may be configured to control the display 760 to display the captured image, or a preview of the captured image, to a user. The display 760 may be external to the imaging device 700 or may be part of the imaging device 700. The display 760 may also be configured to provide a view finder displaying a preview image for a use prior to capturing an image, for example present the user with a visual representation of the dynamic range of the image scene or with a user interface for manually adjusting the number of analog charge dumps and/or digitally accumulated differential frames. The display 760 may comprise an LCD or LED screen, and may implement touch sensitive technologies.

Device processor 755 may write data to storage module 770, for example data representing digitally accumulated differential frames. While storage module 770 is represented graphically as a traditional disk device, those with skill in the art would understand that the storage module 770 may be configured as any storage media device. For example, the storage module 770 may include a disk drive, e.g. a floppy disk drive, hard disk drive, optical disk drive or magneto-optical disk drive, or a solid state memory e.g. a FLASH memory, RAM, ROM, and/or EEPROM. The storage module 770 can also include multiple memory units, and any one of the memory units may be configured to be within the image capture device 700, or may be external to the image capture device 700. For example, the storage module 770 may include a ROM memory containing system program instructions stored within the image capture device 700. The storage module 770 may also include memory cards or high speed memories configured to store captured images which may be removable from the camera. The storage module 770 can also be external to device 700, and in one example device 700 may wirelessly transmit data to the storage module 770, for example over a network connection.

Although FIG. 7 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components, for example to save cost and/or to improve performance.

Additionally, although FIG. 7 illustrates two memory components, including memory component 720 comprising several modules and a separate memory 765 comprising a working memory, one with skill in the art would recognize several embodiments utilizing different memory architectures. For example, a design may utilize ROM or static RAM memory for the storage of processor instructions implementing the modules contained in memory 730. The processor instructions may be loaded into RAM to facilitate execution by the image processor 720. For example, working memory 765 may comprise RAM memory, with instructions loaded into working memory 765 before execution by the processor 720.

Overview of Additional Pixel Architecture and Readout Examples

In some embodiments, the above-described pixel architectures may face challenges in supporting multiple dumps for different pixels. For instance, a shared architecture may have multiple pixels spilling charges onto the floating diffusion and storage capacitor combination. In some instances the signals can be combined and it can be problematic to distinguish the charge contribution from each pixel. For example, when multiple pixels share the floating diffusion node and storage capacitor, it can be difficult to distinguish charge contribution from individual pixels in saturation conditions. Further in some implementations of the shared-pixel cells of FIGS. 2-4, signal may be lost during multiple reads on the floating diffusion node. Accordingly, a number of implementations are proposed in FIGS. 8A-8D for improved support of full well capacity extension by providing a storage capacitor uniquely associated with each photodiode. For example, such implementations can include a storage capacitor positioned between each photodiode and the corresponding timing circuitry and floating diffusion node.

Figure 8A:
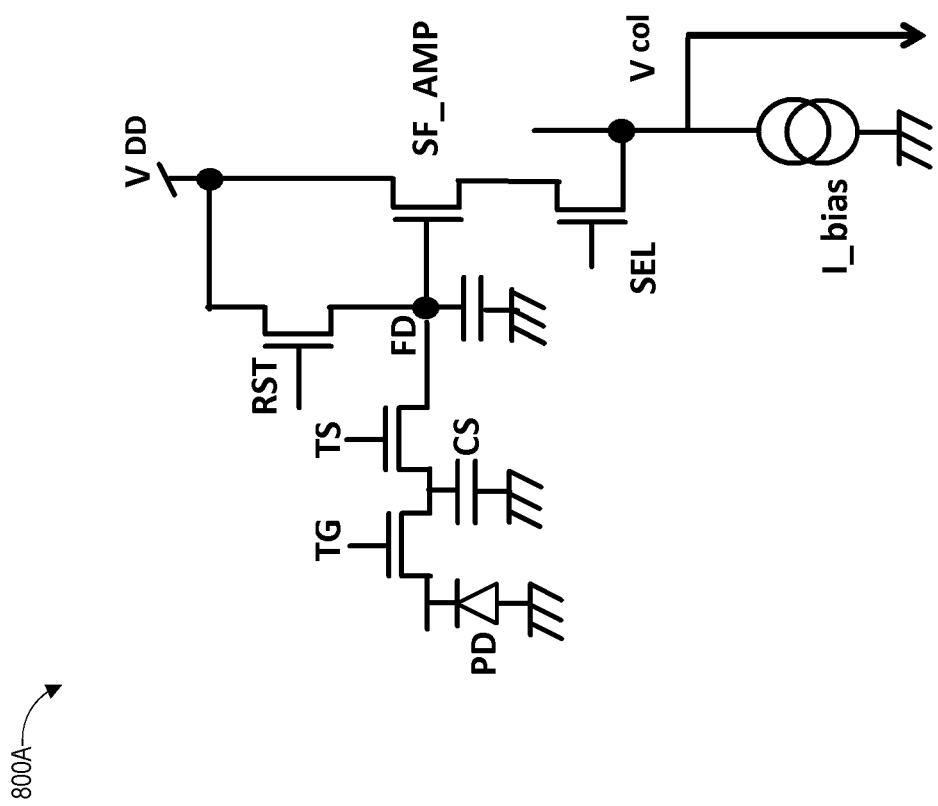
FIG. 8A illustrates another embodiment of a pixel architecture for use as a pixel of the pixel readout system of FIG. 1A.

FIG. 8A illustrates another embodiment of a pixel architecture for use as a pixel of the pixel readout system of FIG. 1A. Many such pixels 800A are arranged in the array 112, for example forming rows and columns, but for simplicity only one is shown in greater detail. The pixel architecture embodiment of FIG. 8A can perform both low noise and lag free charge transfer as well as snap shot features, e.g., frame storage and charge sink. In addition, the storage capacitor CS in combination with the floating diode FD offers extended full well capacity for the pixel 800A.

The pixel circuitry includes a photodiode PD for accumulating photo-generated charge. Charge collected in the photodiode PD can be passed through transfer gate TG to the storage capacitor CS, and the storage capacitor CS can be provided with an effective capacitance large enough to store multiple charge dumps from the photodiode PD, for example eight or more charge dumps. The accumulated charge from the storage capacitor CS can be passed through timing circuitry transistor TS to the floating diffusion node FD. When the timing circuitry TS is turned on, the storage capacitor CS and floating diode FD can share the charge accumulated from the photodiode PD. The selector transistor SEL allows a single row of the pixel array to be read by the image sensor. The source follower SF_AMP converts the input applied from the storage capacitor CS and floating diffusion node FD into the output (e.g., voltage or current) sensed at the output node Vcol; in other words the source follower SF_AMP converts the detected image charges into corresponding electrical signals.

The reset transistor RST acts as a switch to reset the floating diffusion FD and storage capacitor CS. When the reset transistor RST is turned on, the photodiode PD is effectively connected to the power supply, clearing all integrated charge. The pixel is reset when the reset transistor RST, transfer gate TG, and timing circuitry TS are turned on simultaneously, setting the floating diffusion FD, storage capacitor CS, and the photodiode PD to the VDD voltage level. When the transfer gate TG is turned off, disconnecting the photodiode PD and storage capacitor CS, the photodiode PD is left to integrate light. The timing circuitry TS can serve as an overflow gate for blooming protection control as well as enabling snap shot features (e.g., frame storage & charge sink), providing electronic global shuttering operation so as to freeze fast action.

In one example, to implement a kTC noise reduction technique as described above, first, the reset transistor RST is turned on and off to reset the floating diffusion FD and storage capacitor CS. Signal measurement of the reset level is sampled from the floating diffusion FD and storage capacitor CS with the timing scheme TS turned on and stored, for example on a column circuit. Next, the transfer gate TG is turned on and off which allows charge on the photodiode PD to transfer to the storage capacitor CS. When the timing scheme TS is turned on, the storage capacitor CS and floating diffusion FD are connected in parallel. Once charge transfer is complete, this charge (the photodiode signal level plus the floating diffusion reset level) is measured and stored on the column circuit as well. These two stored voltages are then differenced to determine the photodiode signal level, reducing kTC noise.

Figure 8B:
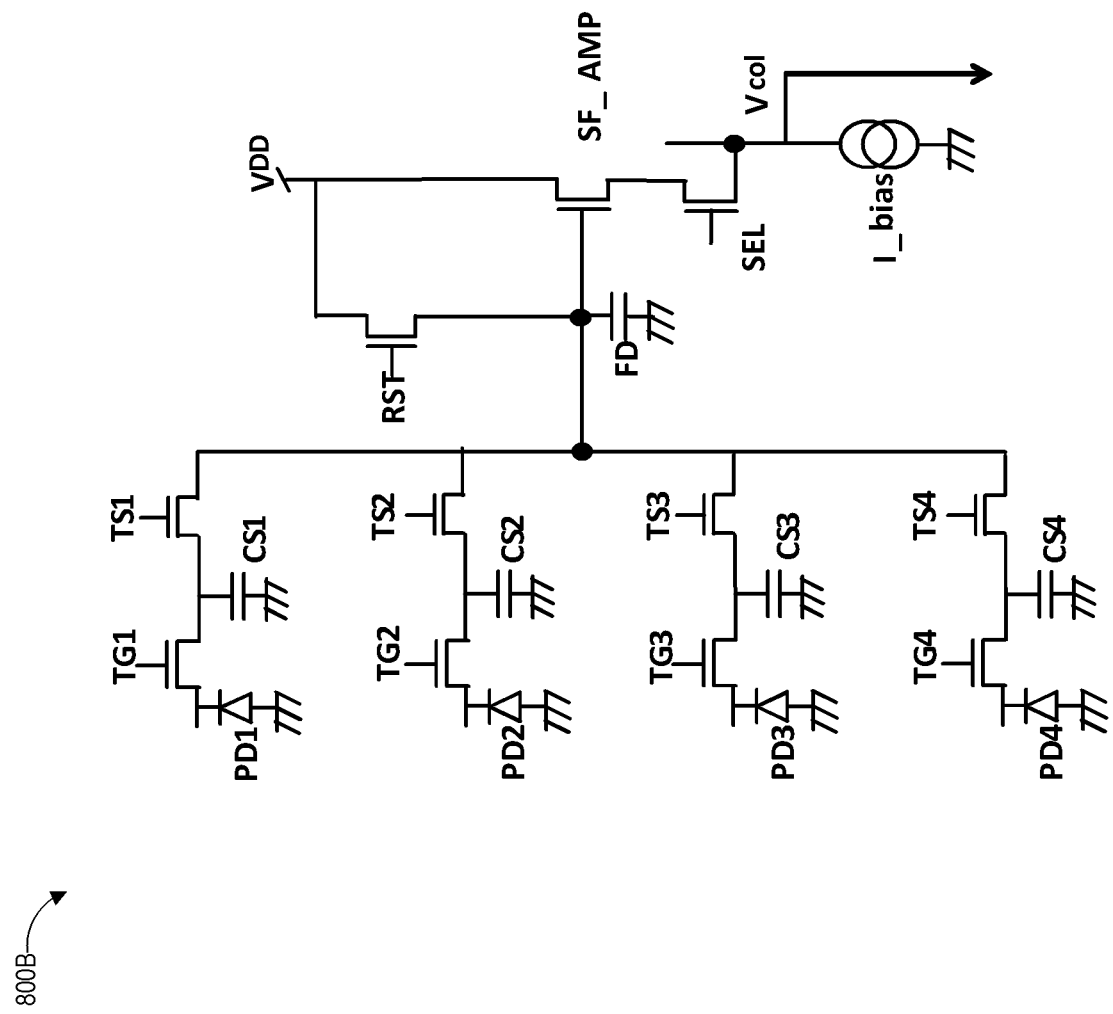
FIG. 8B illustrates another embodiment of a four transistor 4-shared image sensor pixel architecture having full well capacity extension capabilities.

FIG. 8B illustrates an embodiment of a 4-shared image sensor pixel architecture 800B having full well capacity extension capabilities. Some embodiments of the image sensor can be a solid-state image sensor, for example a CMOS image sensor, which has four pixels sharing pixel circuitry and compact layout. The 4-shared pixel architecture 800B can be used as the pixel architecture for pixels 140 in the pixel array 112 in some embodiments. The 4-shared pixel architecture 800B includes four pixels, and though many such pixels are arranged in the array 112, for simplicity only one pixel architecture 800B is shown in greater detail.

The 4-shared pixel architecture 800B includes four photodiodes PD1-PD4 and their corresponding transfer gates TG1-TG4, a floating diffusion node FD, reset transistor RST, voltage supply VDD, source follower amplifier SF_AMP, selector transistor SEL, output voltage node Vcol, and current source Ibias. These elements can perform similar functions as described above with respect to FIG. 8A. The 4-shared pixel architecture 800B also includes a storage capacitor CS1-CS4 and corresponding timing circuitry TS1-TS4 connected in series between each of transfer gates TG1-TG4 and the floating diffusion FD. Sharing of the floating diffusion FD, source follower amplifier SF_AMP, row select transistor SEL, and reset transistor RST, between adjacent photodiodes PD1-PD4 assists in increasing the fill factor of the pixel architecture. In some embodiments, photodiodes PD1-PD4 can include one photodiode used to detect a red component of incoming light, two photodiodes used to detect a green component of incoming light, and one photodiode used to detect a blue component of incoming light.

Charge can be collected by each of the photodiodes PD1-PD4 as long as the corresponding transfer gate TG1-TG4 is off. Multiple integrations of the charge in a photodiode PD1-PD4 can be sent to the associated storage capacitor CS1-CS4 when the associated transfer gate TG1-TG4 is turned on. The accumulated charge is transferred to the floating diffusion FD by turning on the corresponding timing circuitry TS1-TS4 after the predetermined number of integration times. The floating diffusion FD can be a parasitic capacitor inside the silicon wafer of the pixel architecture 800B, however this may not hold enough charge for extending the dynamic range of a sensor with small pixels. Accordingly, the charge from a photodiode PD1-PD4 can be read out multiple times through the associated storage capacitor CS1-CS4 to the floating diffusion FD. The storage capacitor CS1-CS4 can be configured with an effective capacitance large enough to store multiple charge dumps from a photodiode, for example eight or more charge dumps. In some embodiments, the capacitance of the storage capacitor CS1-CS4 is greater than or equal to approximately 3.2 femtofarads. Accordingly, the full well capacity of a pixel can be effectively multiplied in the analog domain by the number of charge dumps stored in the storage capacitor CS1-CS4.

In one example, where a transfer gate TG1-TG4, its associated timing circuitry TS1-TS4, and the reset transistor RST are all on, a corresponding photodiode PD1-PD4, its storage capacitor CS1-CS4, and the floating diffusion FD can be reset to the VDD voltage level. Charge integration can occur when the transfer gate TG1-TG4 and reset transistor RST are off, allowing photon charge to be collected in a corresponding photodiode PD1-PD4. By selectively turning on a transfer gate TG1-TG4, the charge in a corresponding photodiode is transferred to the storage capacitor CS1-CS4 connected to the photodiode PD1-PD4. When the timing circuitry TS1-TS4 is turned on one or more times, the charge stored in storage capacitor CS1-CS4 can flow to the floating diffusion FD. In some embodiments, a transfer gate TG1-TG4 and the associated timing circuitry TS1-TS4 can be turned on simultaneously to transfer charge directly from associated photodiodes directly to the storage capacitor CS1-CS4 and floating diffusion FD.

During the charge readout of one of photodiodes PD1-PD4, all the photoelectrons are mixed at the floating diffusion node FD and an associated one of the integrated storage capacitors CS1-CS4. Then the signal is read out after turning the corresponding transfer gate TG1-TG4 off. After turning the corresponding transfer gate off, the charge sensing node capacitance (that can be input to the SF_AMP's gate) is the combination of capacitors of the floating diffusion FD, one of the storage capacitors CS1-CS4, and the timing circuitry TS1-TS4 connecting the floating diffusion FD and the one storage capacitor. All the charges integrated at the photodiode, floating diffusion FD, and storage capacitor are mixed up followed by readout via the source follower amplifier SF_AMP. This process performs charge-to-voltage conversion, and the V_FD and V_col represent the voltage level at FD and column video bus respectively. The voltage levels at the floating diffusion FD and at V_col may depend upon the incident light level, that is, a number of photons incident on the photodiodes PD1-PD4.

The timing circuitry TS1-TS4 can include high-speed logic for a number of times to read an associated one of the photodiodes PD1-PD4 to read for accumulation of charge in the connected storage capacitor CS1-CS4. The high-speed logic of the timing circuitry can regulate the number of charge dumps sent from a photodiode to the storage capacitor CS. By accumulating multiple charge dumps from a pixel in the analog domain, device power can be saved in comparison to accumulating multiple charge dumps from the pixel in the digital domain. Sequential readout of photodiodes PD1-PD4 using the timing circuitry TS1-TS4 can control the readout of photodiodes PD1-PD4 to increase resolution in comparison to parallel scanning. Due to the high speed logic of the timing circuitry, high video frame rates (e.g., 30 fps at 8 MP full resolution) can still be achieved while sampling each photodiode in the pixel array multiple times in the analog domain, for example eight readouts per pixel per frame. In some embodiments, each of timing schemes TS1-TS4 can be a transistor with a line weight of approximately 20 nm.

One readout mode implemented using the architecture of FIG. 8B can include a first read performed right after reset by turning on the selector SEL circuit. This can store the kTC (thermal noise) in the memory as a baseline. A second readout can be performed after charge integration in the storage capacitor and floating diode by turning on the selector circuit again. Due to the additional capacity of the storage capacitor and the multiple photodiode charge dumps controlled by the timing scheme, the two readouts can provide multiplication of the pixel full well capacity proportionate to the number of charge dumps.

Another readout mode implemented using the architecture of FIG. 8B can perform multiple readouts and obtain the charge difference between two "charge dumps" from a photodiode. The resulting differential frame can be kTC noise free. The multiple readouts can be performed in a low bit depth mode to save power if high accuracy is not needed, for example for a viewfinder preview image or for auto-exposure adjustments. The multiple readouts can be performed in normal bit depth mode for more accurate image information. In some embodiments, for example high dynamic range (HDR) imaging, two different integration times can be used for the charge dumps in two readouts used to generate the differential frame.

Figure 8C:
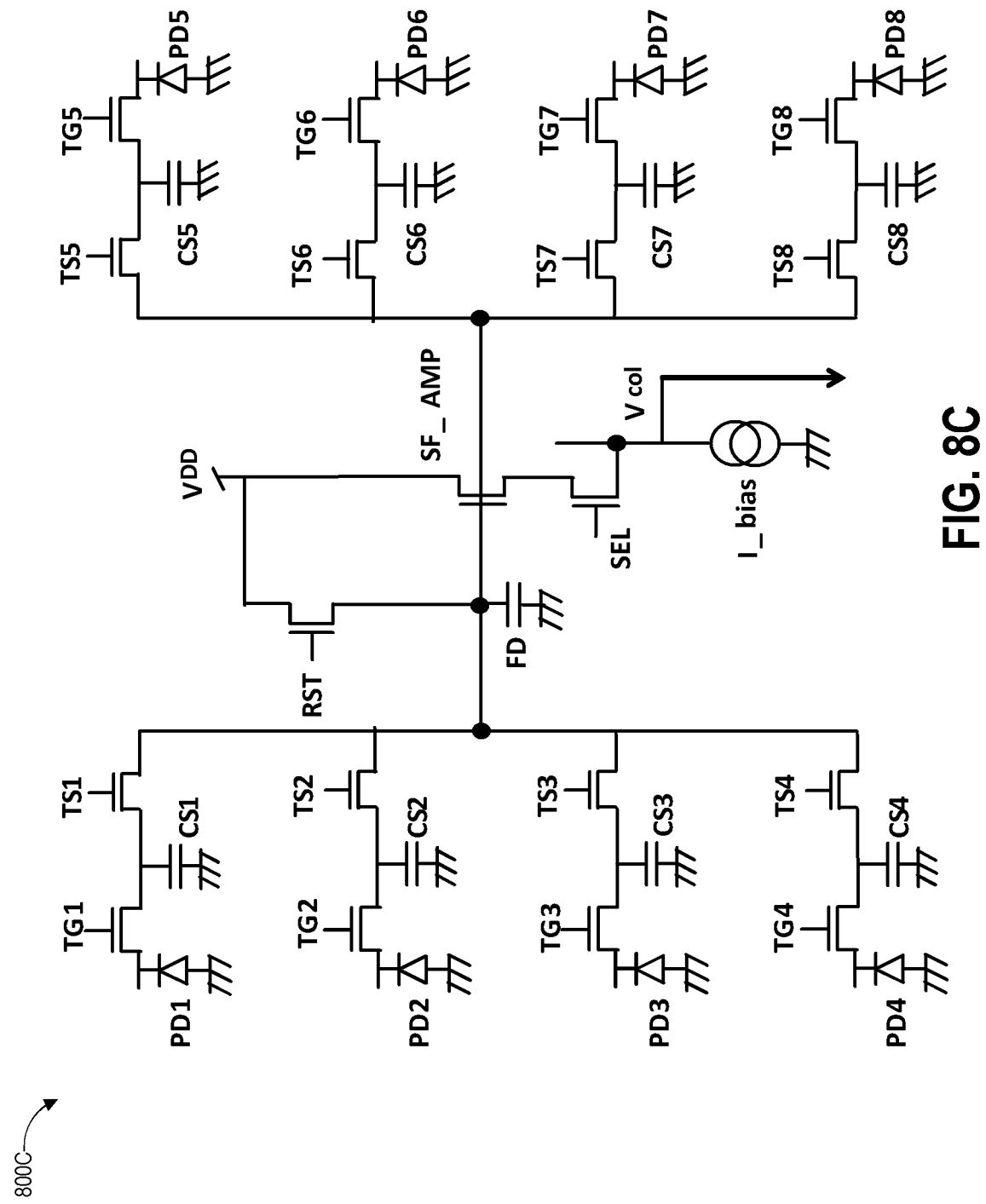
FIG. 8C illustrates another embodiment of a four transistor 8-shared image sensor pixel architecture having full well capacity extension capabilities.

FIG. 8C illustrates an embodiment of an 8-shared image sensor pixel architecture having full well capacity extension capabilities. Some embodiments of the image sensor can be a solid-state image sensor, for example a CMOS image sensor, which has eight pixels sharing pixel circuitry and compact layout. The 8-shared pixel architecture 800C can be used as the pixel architecture for pixels in the pixel array 112 in some embodiments. The 8-shared pixel architecture 800C includes eight pixels, and though many such pixels are arranged in the array 112, for simplicity only one 8-shared pixel architecture 800C is shown in greater detail.

The 8-shared pixel architecture 800C includes eight photodiodes PD1-PD8 and their corresponding transfer gates TG1-TG8, a floating diffusion node FD, reset transistor RST, voltage supply VDD, source follower amplifier SF_AMP, selector transistor SEL, output voltage node Vcol, and current source Ibias. These elements can perform similar functions as described above with respect to FIG. 8A. The 8-shared pixel architecture 800C also includes a storage capacitor CS1-CS8 and corresponding timing circuitry TS1-TS8 connected in series between each of transfer gates TG1-TG8 and the floating diffusion FD. Sharing of the floating diffusion FD, source follower amplifier SF_AMP, row select transistor SEL, and reset transistor RST, between adjacent photodiodes PD1-PD8 assists in increasing the fill factor of the pixel architecture. In some embodiments, photodiodes PD1-PD8 can include two photodiodes used to detect a red component of incoming light, four photodiodes used to detect a green component of incoming light, and two photodiodes used to detect a blue component of incoming light.

As described above, the timing circuitry TS1-TS8 can include high-speed logic configured to control accumulation of one or more charge dumps from a photodiode PD1-PD8 in the associated storage capacitor CS1-CS8 and to cause the accumulated charge to flow to the floating diode FD for power-efficient extension of the small pixel's full well capacity in the analog domain. The accumulated charge can be read out from the storage floating diode FD and connected one of the storage capacitors CS1-CS8 through the source follower SF_AMP to the output voltage node Vcol.

Figure 8D:
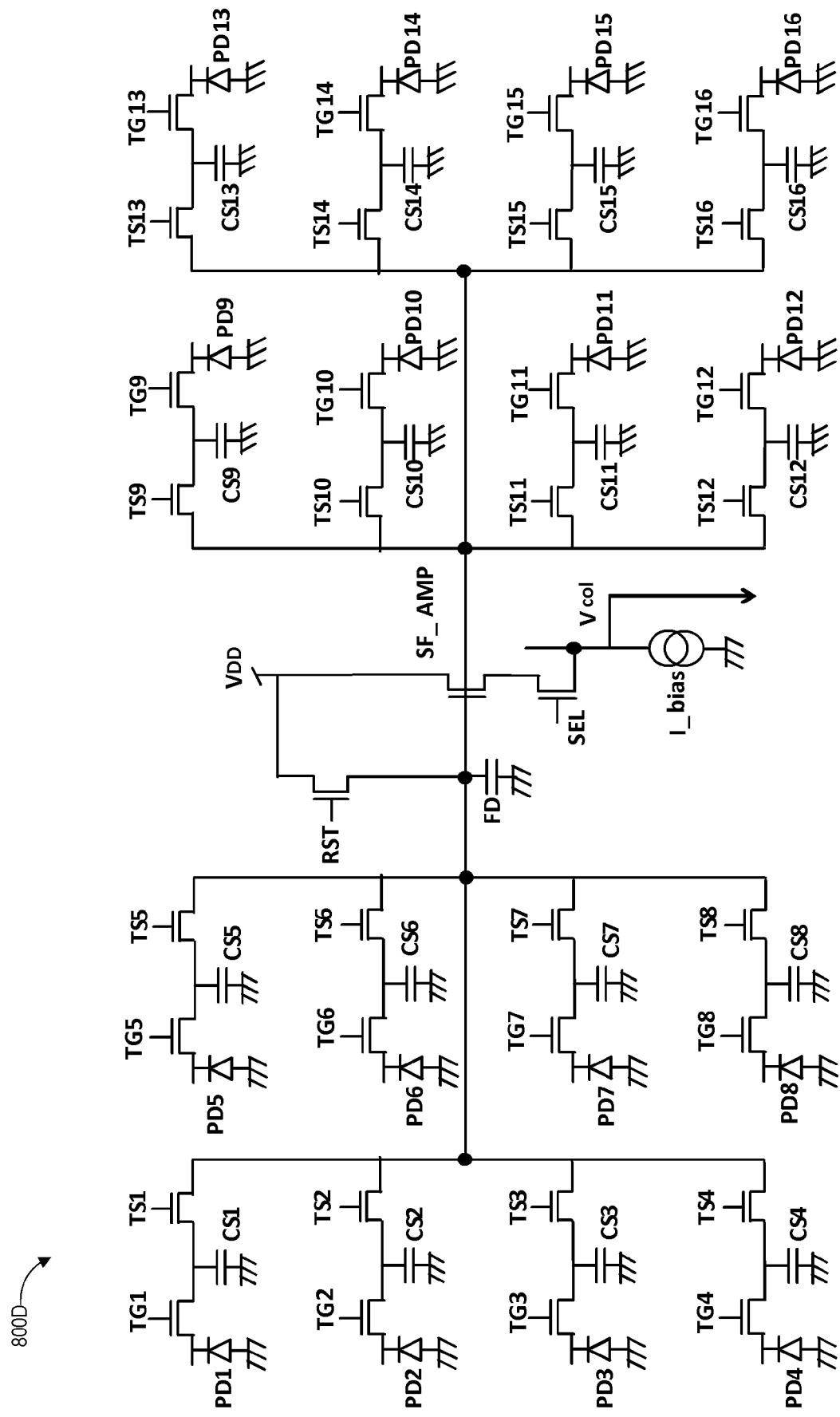
FIG. 8D illustrates another embodiment of a four transistor 16-shared image sensor pixel architecture having full well capacity extension capabilities.

FIG. 8D illustrates an embodiment of a 16-shared image sensor pixel architecture 800D having full well capacity extension capabilities. Some embodiments of the image sensor can be a solid-state image sensor, for example a CMOS image sensor, which has sixteen pixels sharing pixel circuitry and compact layout. The 16-shared pixel architecture 800D can be used as the pixel architecture for pixels in the pixel array 112 in some embodiments. The 16-shared pixel architecture 800D includes sixteen pixels, and though many such pixels are arranged in the array 112, for simplicity only one 16-shared pixel architecture 800D is shown in greater detail.

The 16-shared pixel architecture 800D includes sixteen photodiodes PD1-PD16 and their corresponding transfer gates TG1-TG16, a floating diffusion node FD, reset transistor RST, voltage supply VDD, source follower amplifier SF_AMP, selector transistor SEL, output voltage node Vcol, and current source Ibias. These elements can perform similar functions as described above with respect to FIG. 8A. The 16-shared pixel architecture 800D also includes a storage capacitor CS1-CS16 and corresponding timing circuitry TS1-TS16 connected in series between each of transfer gates TG1-TG16 and the floating diffusion FD. Sharing of the floating diffusion FD, source follower amplifier SF_AMP, row select transistor SEL, and reset transistor RST, between adjacent photodiodes PD1-PD16 assists in increasing the fill factor of the pixel architecture. In some embodiments, photodiodes PD1-PD16 can include four photodiodes to detect a red component of incoming light, eight photodiodes to detect a green component of incoming light, and four photodiodes to detect a blue component of incoming light.

As described above, the timing circuitry TS1-TS16 can include high-speed logic configured to control accumulation of one or more charge dumps from a photodiode PD1-PD16 in the associated storage capacitor CS1-CS16 and to cause the accumulated charge to flow to the floating diode FD for power-efficient extension of the small pixel's full well capacity in the analog domain. The accumulated charge can be read out from the storage floating diode FD and connected one of the storage capacitors CS1-CS16 through the source follower SF_AMP to the output voltage node Vcol.

FIGS. 8A-8B illustrate various pixel circuitry architectures that can be used to extend the full well capacity of small pixels. In some embodiments, having even numbers of shared pixels and/or multiples of four shared pixels can provide for a more compact image sensor layout, pixel symmetry, uniformity of pixel structure, and noise suppression. These examples are provided to illustrate, and not to limit, the full well capacity extension capabilities of having a storage capacitor and timing circuitry associated with each photodiode. In other embodiments, other numbers of shared pixels (e.g., 32) or other pixel architectures including fewer or greater numbers of transistors per pixel (e.g., 3T, 5T, etc.) can be used together with the storage capacitor and timing circuitry to extend pixel full well capacity in the analog domain.

Figure 9A:
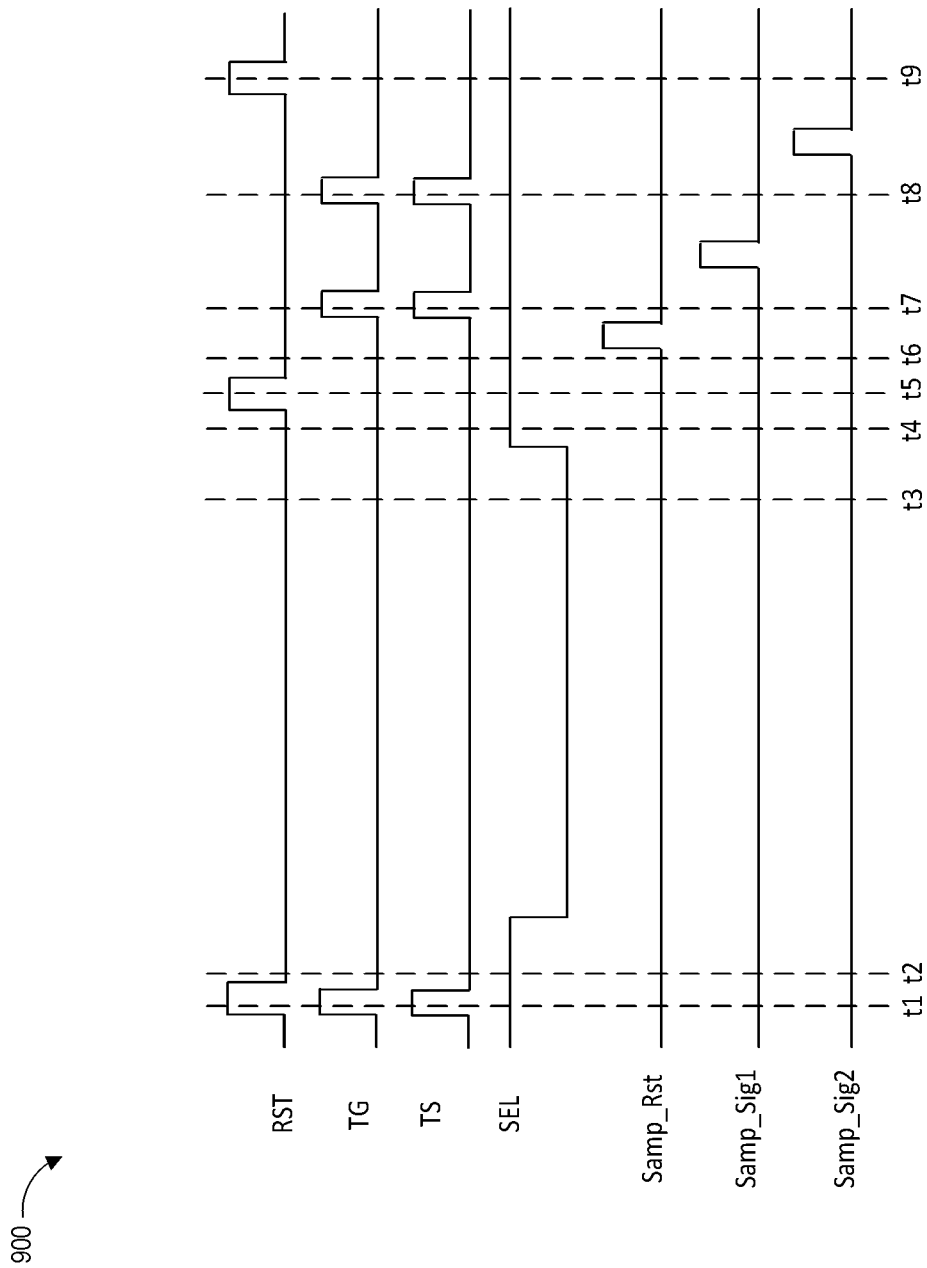
FIG. 9A illustrates an example timing scheme for turning pixel architecture components on and off to perform an embodiment of a kTC noise compensation process using the pixel architecture of any of FIGS. 8A-8D.
Figure 9B:
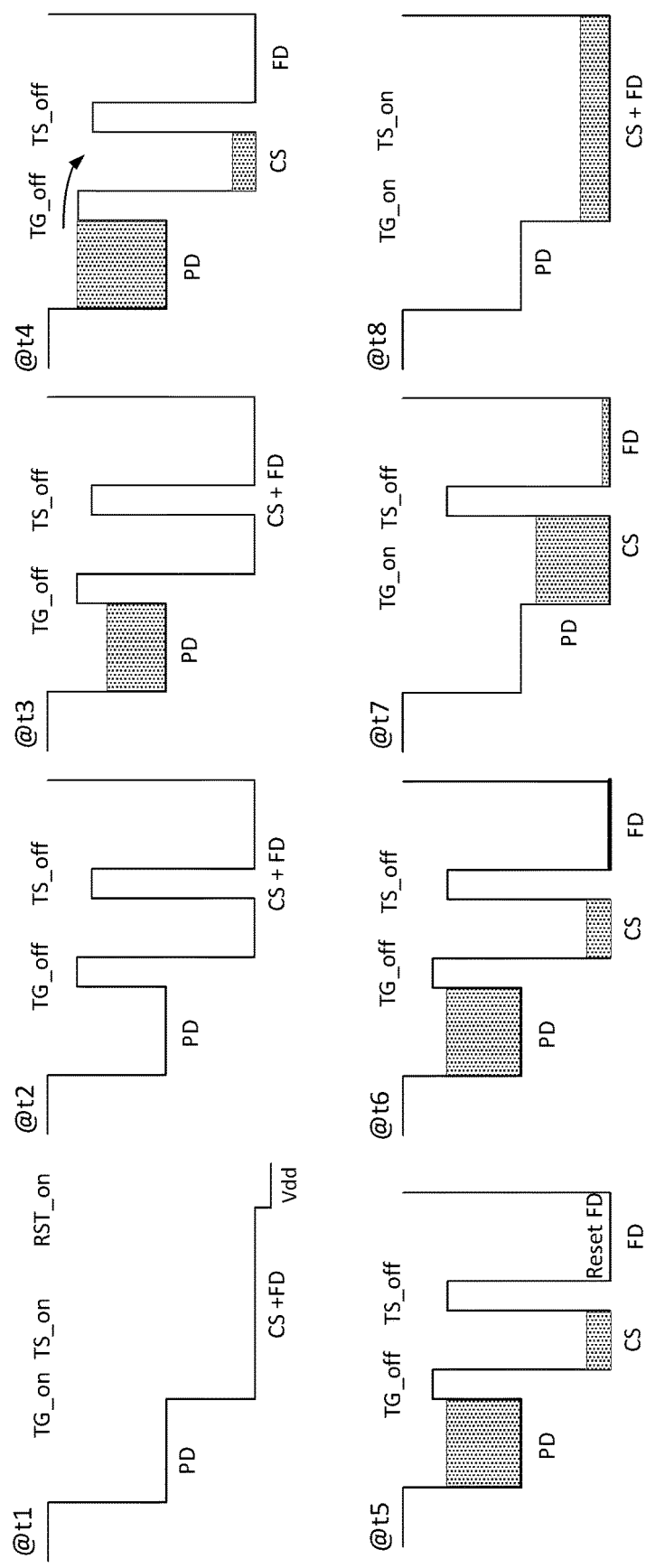
FIG. 9B illustrates a graphical representation of charge flow between pixel architecture components during the timing scheme of FIG. 9A.

FIG. 9A illustrates an example timing scheme for turning pixel architecture components on and off to perform an embodiment of a kTC noise compensation process using the pixel architecture of any of FIGS. 8A-8D. FIG. 9B illustrates a graphical representation of charge flow between pixel architecture components during the timing scheme of FIG. 9A.

The timing scheme 900 can be used to accomplish a pixel readout process having eight steps in accordance with the illustrated timing points @t1 through @t8. At timing point @t1 the photo-detector PD, floating diffusion FD, and storage capacitor CS are reset by turning on the transfer gate TG, timing circuitry TS, and reset transistor RST. At timing point @t2 the reset transistor RST is turned off, the reset noise is read from the floating diffusion FD and storage capacitor CS, and this is followed by light exposure and charge integration in the photodiode PD. At timing point @t3 during charge integration, non-saturated charges stay in the photodiode PD while any saturated charges overflow to the floating diode FD and storage capacitor CS via the transfer gate TG and timing circuitry TS. At timing point @t4 after the integration time is complete the timing circuitry TS is shut off. At timing point @t5, signal charges are split into the storage capacitor CS, followed by resetting the floating diffusion FD by turning on the reset transistor RST. At timing point @t6 the reset noise is readout from the floating diffusion FD. At timing point @t7, photon-generated charges are transferred to the floating diffusion FD as the transfer gate TG is switched on. At timing point @t8 the charge is read out with the timing circuitry TS turned on. Multiple-dump of signal charges occurs by repeating timing points @t7 & @t8 a number of times, and all charges are collected at the floating diffusion FD and storage capacitor CS.

Implementing Systems and Terminology

Implementations disclosed herein provide systems, methods and apparatus for full well capacity extension. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the processes discussed above. The device may also have data, a processor loading instructions and/or data from memory, one or more communication interfaces, one or more input devices, one or more output devices for example a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards for example the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a web site, server, or other remote source using a coaxial cable, fiber optic cable, twisted pair, digital subscriber line (DSL), or wireless technologies for example infrared, radio, and microwave, then the coaxial cable, fiber optic cable, twisted pair, DSL, or wireless technologies for example infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An imaging system comprising:
   an array including a plurality of photosensitive elements;
   a plurality of circuits for reading light integrated in photosensitive elements coupled thereto, each of the plurality of circuits comprising:
   a subset of the plurality of photosensitive elements including at least two photosensitive elements,
   a floating diffusion node shared among the subset of the plurality of photosensitive elements,
   a storage capacitor in communication with the floating diffusion node, the storage capacitor having capacitance for storage of an accumulated charge representing a sum of a plurality of charge dumps from one photosensitive element of the subset, each of the plurality of charge dumps comprising a charge representative of the light integrated in the photosensitive element during an integration time, and
   a timing circuit electrically coupled between the storage capacitor and the floating diffusion node, the timing circuit configured to control a number and timing of the plurality of charge dumps from the photosensitive element to the storage capacitor to generate the accumulated charge, wherein the timing circuit is configured to turn on to electrically couple the storage capacitor in series with the floating diffusion node to extend a full well capacity of the photosensitive element;
   an amplifier in communication with at least one circuit of the plurality of circuits to receive the accumulated charge from the at least circuit and to output an amplified signal having a greater strength than a strength of the charge;
   an analog to digital converter in communication with the amplifier to receive the amplified signal and convert the amplified signal into a digital signal; and
   a memory component configured to store the digital signal.

2. The imaging system of claim 1, wherein each of the plurality of photosensitive elements comprises a photodiode for integrating light and at least one transfer gate connected to the photodiode.

3. The imaging system of claim 2, wherein the transfer gate of each of the at least two photosensitive elements is connected in series with the floating diffusion node.

4. The imaging system of claim 1, wherein the memory component comprises DRAM.

5. The imaging system of claim 1, wherein the memory component is configured to accumulate digital representations of multiple reads from the array for further extending the full well capacity of the at least one photosensitive element.

6. The imaging system of claim 1, wherein the subset of the plurality of photosensitive elements of each of the plurality of circuits comprises four photosensitive elements.

7. The imaging system of claim 1, wherein the subset of the plurality of photosensitive elements of each of the plurality of circuits comprises eight photosensitive elements.

8. The imaging system of claim 1, wherein each of the plurality of circuits further comprises a reset transistor configured to reset one or both of the floating diffusion node and the storage capacitor to a predetermined charge level prior to the plurality of charge dumps.

9. The imaging system of claim 1, wherein each of the plurality of circuits further comprises:
   a source follower amplifier configured to receive the accumulated charge from the storage capacitor; and
   a row select transistor configured to activate the source follower amplifier of a selected row of the plurality of photosensitive elements.

10. The imaging system of claim 1, wherein the storage capacitor is has capacitance to store eight or more charge dumps from the photosensitive element.

11. The imaging system of claim 1, further comprising a sensor chip comprising the plurality of photosensitive elements, wherein the storage capacitor is provided in the sensor chip.

12. An image sensor comprising:
an array including a plurality of photosensitive elements;
a plurality of circuits for reading light integrated in photosensitive elements coupled thereto, each of the plurality of circuits comprising:
a subset of the plurality of photosensitive elements including at least two photosensitive elements,
a floating diffusion node shared among the subset of the plurality of photosensitive elements,
a storage capacitor in communication with the floating diffusion node, the storage capacitor having capacitance for storage of an accumulated charge representing a sum of a plurality of charge dumps from one photosensitive element of the subset, each of the plurality of charge dumps comprising a charge representative of the light integrated in the photosensitive element during an integration time, and
a timing circuit electrically coupled between the storage capacitor and the floating diffusion node, the timing circuit configured to control a number and timing of the plurality of charge dumps from the photosensitive element to the storage capacitor to generate the accumulated charge, wherein the timing circuit is configured to turn on to electrically couple the storage capacitor in series with the floating diffusion node to extend a full well capacity of the photosensitive element.

13. The image sensor of claim 12, wherein each of the plurality of photosensitive elements comprises a photodiode for integrating light and at least one transfer gate connected to the photodiode.

14. The image sensor of claim 12, wherein the transfer gate of each of the at least two photosensitive elements is connected in series with the floating diffusion node.

15. The image sensor of claim 12, wherein the storage capacitor is configured with a capacitance to store eight or more charge dumps from the photosensitive element.

16. The image sensor of claim 12, wherein each of the plurality of circuits further comprises a reset transistor configured to reset one or both of the floating diffusion node and the storage capacitor to a predetermined charge level prior to the plurality of charge dumps.

17. The image sensor of claim 16, wherein each of the plurality of circuits further comprises:
a source follower amplifier of a selected row including the subset of the plurality of photosensitive elements configured to receive the accumulated charge from the storage capacitor via the floating diffusion node; and
a row select transistor configured to activate the source follower amplifier.

18. The image sensor of claim 17, wherein the subset of the plurality of photosensitive elements of each of the plurality of circuits comprises four photosensitive elements, and wherein the reset transistor, floating diffusion node, source follower amplifier, and row select transistor of each of the plurality of circuits is shared between the four photosensitive elements.

19. The image sensor of claim 17, wherein the subset of the plurality of photosensitive elements of each of the plurality of circuits comprises eight photosensitive elements, and wherein the reset transistor, floating diffusion node, source follower amplifier, and row select transistor of each of the plurality of circuits is shared between the eight photosensitive elements.

20. The image sensor of claim 17, wherein the subset of the plurality of photosensitive elements of each of the plurality of circuits comprises sixteen photosensitive elements, and wherein the reset transistor, floating diffusion node, source follower amplifier, and row select transistor of each of the plurality of circuits is shared between the sixteen photosensitive elements.

* * * * *